(12) United States Patent
Coombes et al.

(10) Patent No.: US 10,237,939 B2
(45) Date of Patent: *Mar. 19, 2019

(54) DEVICES, SYSTEMS, AND METHODS FOR MAINTAINING LIGHT INTENSITY IN A GATEWAY BASED LIGHTING SYSTEM

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,797

(22) Filed: Nov. 10, 2017

(65) Prior Publication Data
US 2018/0139818 A1    May 17, 2018

Related U.S. Application Data

(63) Continuation-in-part of application No. 15/785,808, filed on Oct. 17, 2017, now Pat. No. 10,021,757, (Continued)

(51) Int. Cl.
*H05B 33/08* (2006.01)
*H05B 37/02* (2006.01)

(52) U.S. Cl.
CPC ..... *H05B 33/0851* (2013.01); *H05B 33/0869* (2013.01); *H05B 33/0893* (2013.01); *H05B 37/0218* (2013.01); *H05B 37/0272* (2013.01)

(58) Field of Classification Search
CPC ............ H05B 33/0851; H05B 33/0869; H05B 33/0893; H05B 37/0218; H05B 37/0272
See application file for complete search history.

(56) References Cited

U.S. PATENT DOCUMENTS

| | | | |
|---|---|---|---|
| 3,971,065 | A | 7/1976 | Bayer |
| 4,245,241 | A | 1/1981 | Sato et al. |

(Continued)

FOREIGN PATENT DOCUMENTS

| | | |
|---|---|---|
| CA | 1315331 C | 3/1993 |
| CA | 2594246 A1 | 1/2008 |

(Continued)

OTHER PUBLICATIONS

Lighting Research Center, Assist: Alliance for Solid-State Illumination Systems and Technologies, Feb. 15, 2005, 2 pages, http://www.lrc.rpi.edu/programs/solidstate/assist/index.asp.

(Continued)

*Primary Examiner* — Jimmy Vu
*Assistant Examiner* — Laura Yesildag
(74) *Attorney, Agent, or Firm* — Moyles IP, LLC

(57) ABSTRACT

The disclosure relates to devices, systems, and methods to set, adjust, and/or maintain lumen levels of luminaires in a lighting system, for example. The lights may be a plurality of Light Emitting Diode (LED)-based luminaires, which are part of a smart illumination system. In certain exemplary embodiments, sensor subsystems detect degradation of luminaire lumen levels and servers/gateways are used to adjust dimming controls to reestablish proper lumen levels and predict a half-life or end of life for the luminaires.

15 Claims, 25 Drawing Sheets

Related U.S. Application Data which is a continuation-in-part of application No. 15/424,868, filed on Feb. 5, 2017, now Pat. No. 9,992,843, which is a continuation-in-part of application No. 15/360,879, filed on Nov. 23, 2016, now Pat. No. 9,655,197.

(60) Provisional application No. 62/579,459, filed on Oct. 31, 2017, provisional application No. 62/521,817, filed on Jun. 19, 2017, provisional application No. 62/510,739, filed on May 24, 2017, provisional application No. 62/445,669, filed on Jan. 12, 2017, provisional application No. 62/420,908, filed on Nov. 11, 2016, provisional application No. 62/306,636, filed on Mar. 11, 2016.

(56) References Cited

U.S. PATENT DOCUMENTS

| | | |
|---|---|---|
| 4,894,601 A | 1/1990 | Watkins |
| 4,945,280 A | 7/1990 | Beghelli |
| 5,154,504 A | 10/1992 | Helal et al. |
| 5,770,928 A | 6/1998 | Chansky et al. |
| 6,538,568 B2 | 3/2003 | Conley, III |
| 7,045,964 B1 | 5/2006 | Hermans |
| 7,248,297 B2 | 7/2007 | Catrysse et al. |
| 7,608,807 B2 * | 10/2009 | Hick .................... G01J 1/18 250/205 |
| 7,777,427 B2 | 8/2010 | Stalker, III |
| 7,893,632 B2 | 2/2011 | Meijer et al. |
| 7,950,832 B2 | 5/2011 | Tanaka et al. |
| 8,319,452 B1 | 11/2012 | Hamel et al. |
| 8,442,785 B2 | 5/2013 | Walters et al. |
| 8,643,304 B2 | 2/2014 | Hamel et al. |
| 8,729,834 B1 | 5/2014 | Funderburk et al. |
| 8,928,232 B2 | 1/2015 | Aggarwal .......... H05B 37/0245 315/149 |
| 9,084,308 B2 | 7/2015 | Morrow |
| 9,131,581 B1 | 9/2015 | Hsia et al. |
| 9,148,936 B2 | 9/2015 | Wagner et al. |
| 9,277,632 B2 | 3/2016 | Hegarty |
| 9,408,280 B2 | 8/2016 | Schröder et al. |
| 9,521,733 B2 | 12/2016 | Brand et al. |
| 9,655,197 B1 | 5/2017 | Coombes et al. |
| 2006/0237636 A1 | 10/2006 | Lyons et al. |
| 2011/0254554 A1 | 10/2011 | Harbers |
| 2012/0139417 A1 | 6/2012 | Mironichev et al. |
| 2013/0181636 A1 | 7/2013 | Agrawal |
| 2013/0193876 A1 * | 8/2013 | Cleland .............. H05B 37/0245 315/297 |
| 2014/0097758 A1 | 4/2014 | Recker et al. |
| 2014/0320022 A1 | 10/2014 | Lee |
| 2014/0375221 A1 | 12/2014 | Mans et al. |
| 2015/0054410 A1 * | 2/2015 | Sanders ............. H05B 33/0857 315/151 |
| 2015/0061498 A1 * | 3/2015 | Paffrath ............. H05B 33/0854 315/113 |
| 2015/0130365 A1 | 5/2015 | Kim et al. |
| 2015/0257243 A1 | 9/2015 | Saffari ............... H05B 37/0272 315/113 |
| 2016/0003670 A1 | 1/2016 | Li et al. |
| 2016/0014867 A1 | 1/2016 | Luk |
| 2016/0036268 A1 | 2/2016 | Laherty et al. |
| 2016/0088711 A1 | 3/2016 | Ng et al. |
| 2016/0302273 A1 | 10/2016 | Wee et al. |
| 2016/0360594 A1 | 12/2016 | Chemel |
| 2017/0094755 A1 | 3/2017 | Daranyi et al. |
| 2017/0267175 A1 | 9/2017 | Ichikawa |

FOREIGN PATENT DOCUMENTS

| | | |
|---|---|---|
| CN | 2349441 Y | 11/1999 |
| CN | 2356211 Y | 12/1999 |
| CN | 203104909 U | 7/2013 |
| DE | 202004004459 U1 | 8/2004 |
| DE | 102012210743 A1 | 1/2014 |
| EP | 0940904 A2 | 9/1999 |
| EP | 1035628 A1 | 9/2000 |
| EP | 1043826 A2 | 10/2000 |
| EP | 2242333 A1 | 10/2010 |
| GB | 2380620 A | 4/2003 |
| GB | 2494151 A | 3/2013 |
| WO | WO-2009104135 A1 | 8/2009 |
| WO | WO-2015108489 A1 | 7/2015 |
| WO | WO-2015177762 A2 | 11/2015 |
| WO | WO-2016003672 A1 | 1/2016 |
| WO | WO-2016054413 A1 | 4/2016 |

OTHER PUBLICATIONS

U.S. Department of Energy, LED Measurement Series: LED Luminaire Reliability, Oct. 2009, 4 pages, www.ssl.energy.gov.

Philips, Understanding power LED Lifetime analysis, Technology White Paper, Dec. 5, 2016, 11 pages, www.lrc.rpi.edu/programs/solidstate/assist/index.asp.

Kevin Dowling, PhD, Lumen Maintenance IESNA LM-80-2008, Oct. 30, 2008, 16 pages, www1.eere.energy.gov/buildings/publications/pdfs/ssl/lm80-webcast_10-30-08.pdf.

Jeff McCullough, LC, Pacific NW National Lab, Energy Star® Webinar:Requirements for Lumen Maintenance, Oct. 30, 2008, 18 pages, www1.eere.energy.gov/buildings/publications/pdf.

M-CAM Patently Obvious, Kodak's Final Gasp? Intellectual Property Analysis of *Kodak v Apple, HTC*, Jan. 13, 2012, 8 pages, http://www.globalinnovationcommons.org.

Claire Swedberg, IoT Lights Up Streets With Smart City Initiative, RFiD Journal, Jul. 23, 2015, 3 pages, http://www.iotjournal.com/articles/view?13303.

DALI, Discover DALI—Excellent System Performance, Mar. 31, 2014, 5 pages, http://dali-ag.org/discover-dali.html.

International Search Report and Written Opinion of International Application No. PCT/IB2017/051390, dated May 31, 2017,13 pgs.

International Search Report and Written Opinion of International Application No. PCT/IB2017/051386, dated Jun. 6, 2017, 12 pgs.

U.S. Office Action dated Sep. 11, 2018 in U.S. Appl. No. 15/809,739, filed Nov. 10, 2017, 29 pgs.

International Search Report International App. No. PCT/IB2018/054387, dated Sep. 28, 2018, which is in the same family as U.S. Appl. No. 15/809,739, 3 pgs.

Written Opinion of International App. No. PCT/IB2018/054387, dated Sep. 28, 2018, which is in the same family as U.S. Appl. No. 15/809,739, 8 pgs.

IPO Combined Search and Examination Report of GB1806873.4, which is relevant to U.S. Appl. No. 15/809,797, dated Oct. 29, 2018, 8 pgs.

* cited by examiner

DEVICES, SYSTEMS, AND METHODS FOR MAINTAINING LIGHT INTENSITY IN A GATEWAY BASED LIGHTING SYSTEM

CROSS-REFERENCE TO RELATED APPLICATIONS

This application claims the benefit of U.S. Provisional Patent Application Ser. No. 62/521,817 filed Jun. 19, 2017. The application is a continuation-in-part of and claims priority to U.S. patent application Ser. No. 15/785,808 filed Oct. 17, 2017, which claims the benefit of U.S. Provisional Patent Application Ser. No. 62/510,739 filed May 24, 2017 and is a continuation-in-part of and claims priority to U.S. patent application Ser. No. 15/424,868 filed Feb. 5, 2017, which claims the benefit of U.S. Provisional Patent Application Ser. No. 62/445,669 filed Jan. 12, 2017 and is a continuation-in-part of and claims priority to U.S. patent application Ser. No. 15/360,879 filed Nov. 23, 2016, now U.S. Pat. No. 9,655,197, which claims the benefit of U.S. Provisional Patent Application Ser. No. 62/306,636 filed Mar. 11, 2016. This application also claims the benefit of U.S. Provisional Application Ser. No. 62/420,908 filed Nov. 11, 2016. This application also claims the benefit of U.S. Provisional Application Ser. No. 62/579,459 filed Oct. 31, 2017. The disclosures of all of the applications listed above are incorporated herein by reference in their entirety.

FIELD OF THE DISCLOSURE

The disclosure relates generally to commissioning and maintaining lighting systems. More specifically, the disclosure is directed to monitoring and maintaining the light intensity or lumen level of a luminaire or a group of luminaires that occupy the same or connected environment(s), for example and without limitation, spaces, rooms, and/or lit areas generally, using a lighting system incorporating, among other things, gateway-based dimming controls.

BACKGROUND OF THE DISCLOSURE

The lifetime of traditional light sources (incandescent, fluorescent, and high-intensity discharge lamps) is estimated through industry-standard lamp rating procedures. The number is typically determined by an operation that runs a large, statistically significant sample of a type of lamp until 50% have failed and that number of hours defines "rated life" for that lamp. Based on years of experience with traditional light sources, lighting experts can confidently use lamp life ratings, along with known lumen depreciation curves, to design the lighting for a space, and to determine equipment change schedules and economic payback. This aspect of predictive life or half-life of a light source is not true with Light Emitting Diodes (LED).

The primary reason why LED-based luminaires are immensely popular is because of their operational longevity and low power consumption. LEDs generally do not fail abruptly like traditional light sources; instead, their light output slowly diminishes over time. However, LED light sources can have such long lives that life testing and acquiring real application data on long-term reliability become problematic—new versions of products are available before current ones can be fully tested. On top of that, LED light output and useful life are highly dependent on electrical and thermal conditions that are determined by the luminaire and system design and environment.

Digital intelligent lighting control systems can switch and dim individual luminaries in a light scene or space (i.e., an "environment"), which provides a great amount of flexibility, for example, setting appropriate LED output under particular conditions including the level of LED lumen depreciation. For purposes of this disclosure, "environment" means generally and without limitation a space or area in which a luminaire or lighting system is installed. Such known lighting control systems have many user-friendly features for installation, programming, and operation. Lighting control systems can thus be integrated into a building management system as a subsystem of the central light controls.

A lighting control network includes one or more lighting devices; e.g., electrical ballasts (such as a luminaires), LED devices, and dimmers, among other things. In the case of dimmers, the dimmers must support specific interfaces for receiving control inputs and dimming the lights appropriately. Different lighting devices can support different control interfaces for dimming, e.g., to achieve a particular lumen level or light intensity as between different LED brands and/or powers.

The lumen level of a luminaire is the look and feel of the light produced by the luminaire. Current lighting control systems do not provide a system or method for allowing users to predict, after the fixture has been installed, when lumen degradation has occurred to the point where the light needs to be replaced. Current lighting control systems use, for example, environmental input sensors, which are directly connected to the luminaire to sense environmental conditions.

For example, current lighting control systems include a Digital Addressable Lighting Interface (DALI®) protocol-based system, which includes a controller, a driver, and a signal converter. The DALI® system is capable of regulating lumen level of a luminaire by adjusting a dimming level of the luminaire so long as the luminaire is the same make and type throughout the entire system, which has been pre-designed around such luminaires.

Thus, at least one drawback of the DALI® system and other current systems is that current systems may use a single or a fixed dimming control technology which may be set during lighting system commissioning and may not be adjusted during the life or state of degradation of a luminaire. Furthermore, these systems cannot control dynamic environments in which luminaires not present at the time of inception are introduced; that is, the lighting systems must be developed and tested with the technology and parameters available during initial commissioning of the lighting system. There is no system learning capacity to dynamically integrate new luminaires and different types of LEDs, for example, with different powers, into the system.

Thus, devices, systems, and methods for allowing a user who installs tens of thousands of luminaire systems to predict when and how much every luminaire has been degraded and/or adjust dimming level control over time provides enhanced convenience, control, and economics in lighting systems. The devices, systems, and methods may scale to very large numbers of luminaires at a global level. Such devices, systems, and methods may, for example, identify in real time the current state, such as ON/OFF, lumen level, and/or degradation state of at least one luminaire.

Such devices, systems, and methods may also be capable of maintaining the lumen levels of each luminaire regardless of dimming protocols, type of luminaire, or environmental characteristics associated with the luminaire.

Further, current techniques for luminaire dimming may be controlled by multiple standard protocols. The implementations are varied and the results cannot be correlated. The luminaires can control their light intensity or lumen level one at a time; e.g., every luminaire can have a sensor and a dimming control that can be set to a specific lumen level. Thus, when a group of luminaires occupy the same space, or same room, those luminaires will often be identical otherwise controlling the dimming level will not project a correct lumen level in the room. On the other hand, devices, systems, and methods which allow for any dimming protocol to be in the same space with a variety of luminaires/LEDs and yet generate a specific, overall lumen level for the space using the sensors and dimming control in real time provide further flexibility in lighting control systems.

For purposes of this disclosure, "protocol" means, for example and without limitation, one or more instructions, sequences, processes, algorithms, responses, or actions.

For purposes of this disclosure, "real time" means substantial concurrency. "Real time" is not used to imply any particular timeframe or limitation.

BRIEF DESCRIPTION OF THE EXEMPLARY EMBODIMENTS

The disclosed exemplary embodiments are directed generally to devices, systems, and methods that set, adjust, and/or maintain appropriate lumen levels or light intensity of lights. The lights may be a plurality of LED-based luminaires, which are part of a smart illumination system. The system includes, among other things, one or more gateway devices that are connected to the LED-based luminaires over wired and/or wireless technologies and to cloud servers at least in part over wireless networks. The disclosed devices, systems, and methods may be used locally to a luminaire, as well as by utilization of Internet of Things (IoT) networks in which luminaires of a lighting system are identified and stored on, e.g., web- or cloud-based networks. The exemplary disclosed devices, systems, and methods may set, control/adjust, and/or maintain the overall lumen level or light intensity of a luminaire or an environment in which one or more luminaires is installed according to a user designed setting or other level or protocol.

The exemplary disclosed devices, systems, and methods of handling lumen level or light intensity variation over time take into consideration, among other things, all of the factors mentioned above including lumen degradation, environmental conditions, the number and type of luminaires/LEDs in an environment, the requisite or desired lumen level in an environment, and/or other factors as may be disclosed herein. The exemplary disclosed embodiments generally include a plurality of sensors such as at least one up looking color sensor that measures changes in lumen level or light intensity at a luminaire/LED relative to a baseline. The baseline is set dynamically by the systems and methods in order to adapt to changes in hardware or environment inputs. The systems and methods can also support individualized user setups. Individualized setups may include, for example and without limitation, multiple parameters such as lumen level, dimming level, and dimming transitions, all of which are managed by the systems.

For purposes of this disclosure, the terms "device(s)", "system(s)", and "method(s)" may be used individually, separately, conjunctively, or collectively to describe the disclosed embodiments and aspects without limiting such descriptions.

In one or more exemplary embodiments, the disclosed systems and methods provide, among other things, a sensor and control system for controlling lumen level of a luminaire, including: a dimming control configured to control a dimming level of the luminaire, where higher dimming levels result in less light (i.e., lower lumen levels) and lower dimming levels result in more light (i.e., higher lumen levels); at least one sensor such as an up looking color sensor configured to take light intensity or lumen level readings of the luminaire; a gateway configured to receive the lumen level readings from the at least one sensor and to control illumination (i.e., lumen level) of the luminaire via providing instructions to the dimming control, and; a server such as a cloud server (in certain exemplary embodiments) configured to control operation of the gateway, wherein the cloud server is further configured to correlate an initial measured lumen level reading to an initial dimming level, and the at least one sensor sends periodic lumen level readings to the server either directly or via the gateway when the lumen level readings are outside of the sensor ranges expected by the system as instructed by the server. The cloud server compares the lumen level readings received from the sensor and/or gateway to the initial correlation of the measured lumen level reading to the initial dimming level to determine whether the dimming control protocol needs to be adjusted to maintain the lumen level of the luminaire, and the cloud server instructs the gateway to adjust the dimming control to adjust the lumen level of the luminaire when the measured lumen level needs to be adjusted.

The exemplary disclosed systems and methods are configured to allow control of at least one luminaire dimming protocol in an environment, wherein the system generates a specific/required lumen level using up looking color sensors and dimming control systems in real time; wherein the at least one gateway is connected to the up looking color sensor that provides information on relative lumen intensity regardless of power consumption or dimming level, thereby allowing an accurate maintenance/control of the lumen level when the luminaire capacity is diminishing over time or changes are made between different dimming protocols in the dimming control system. The system is further configured to maintain light intensity based on information regarding light intensity and relative lumen intensity readings at different dimming levels for each luminaire with respect to the baseline reading for each of the luminaires, thereby the light intensity of each luminaire may be maintained uniformly or to maintain a desired light intensity of the environment in which the luminaire(s) are installed. Further, at least one dimming control system includes dead band areas or empty ranges through which the dimming level of the luminaire will not change—therein the dimming level has no impact on actual lumen intensity from the luminaire through these dead band areas or empty ranges. The system is further configured to control and maintain the dead band areas or empty ranges in the dimming control system.

In various aspects, the server, e.g., the cloud server can instruct the gateway to adjust the dimming control to adjust the lumen level of the luminaire so as to keep the lumen level of the luminaire constant over time or keep the lumen level of the luminaire at user-set preferences according to, for example, a dimming protocol. Additionally, the exemplary cloud server can instruct the gateway to adjust the dimming control to adjust the lumen level of the luminaire in response to pre-scheduled changes such as changes in ambient background lighting over the course of a day.

In another aspect of the exemplary disclosed embodiments, the system may determine when the luminaire/LED can no longer maintain requisite or desired light intensity and notify a user of the same via a user interface. The system measures the lumen level and when lumen performance falls below a certain level, the user will be notified that specific luminaires must be replaced in order to maintain light intensity/lumen preferences.

In another aspect of the exemplary disclosed systems and methods, new luminaires/LEDs installed as replacements can be automatically and dynamically integrated into the lighting system because the sensor subsystem, dimming controls, gateway, and other disclosed components can set, adjust, and/or maintain the new lighting devices. For example, the exemplary system may access information stored on the exemplary cloud servers that will cause the new/modified luminaire/LEDs introduced into the system to automatically adopt and adjust to previously defined user preferences.

In another aspect, the exemplary disclosed systems and methods calculate at least one of a half-life or end of life for a luminaire based at least in part on at least one of a lumen level or degradation of the lumen level of the luminaire and/or a comparison of the current lumen level at the current dimming level of the luminaire to a correlation between a previous (or initial) lumen level and dimming level. In the exemplary or other embodiments, the systems and methods include a luminaire database that collects over time information related to a luminaire including fitting and dimming components and test data, sensor reading ranges, and sensor readings from a sensor subsystem including time, lumen level, dimming level, and temperature of each reading for the exemplary server to use for predicting and generating luminaire degradation profiles over time based on the information in the luminaire database.

The disclosure also includes an exemplary method of controlling lumen level of a luminaire, by: measuring an initial lumen level of the luminaire; measuring an initial dimming level of the luminaire; correlating the initial lumen level of the luminaire to the initial dimming level of the luminaire; taking periodic lumen level measurements of a luminaire; sending the periodic lumen level measurements from a sensor to a server either directly or via a gateway; having the gateway continually adjust the dimming of the luminaire to control the lumen level of the luminaire over time, wherein the gateway sends lumen level sensor readings to a cloud server when the lumen level sensor readings are outside of lumen level sensor ranges expected by the sensor and/or gateway according to the correlation of the initial lumen level of the luminaire to the initial dimming level of the luminaire, provided by the server, and the cloud server compares the lumen level sensor readings received from the gateway to the initial (or a previous) correlation of the measured lumen level sensor reading to the initial dimming level to determine whether the dimming control needs to be adjusted to adjust the lumen level of the luminaire; and, having the cloud server instruct the gateway to adjust the dimming control to adjust the lumen level of the luminaire when the measured lumen level needs to be adjusted.

In the same or other embodiments, the system is capable of scheduling a plurality of different lumen levels associated with many different luminaires. These lumen levels can be adjusted by triggers such as time of day, environmental sensors, or dimming levels.

In another aspect of the embodiments, the system can correlate between sensors across an entire lighting system. For example, an environmental change in one location can trigger a lumen level change at a different location. The exemplary disclosed systems can detect localized lumen level changes in areas in which one or more luminaires are installed and adjust (or not) one or more particular luminaires in the area to maintain desired lumen levels in the area.

In another aspect, a known database of information is generated by luminaire manufacturers and includes lumen level information at every dimming level of a luminaire. This information, e.g. the light intensity measured at a plurality of dimming levels as provided by the manufacturer, is used as a baseline measurement. The disclosed embodiments can maintain the lumen level (to be constant over time) by changing the dimming level over time until the correct light intensity is measured with an upward looking color sensor. The embodiments thereby allow for the installation of sensors at different locations that are independent of the luminaire and allow for the use of sensors that are not calibrated to any specific luminaire and yet are able to maintain lumen level correctly over long period of times.

BRIEF DESCRIPTION OF THE FIGURES

A more particular description will be rendered by reference to specific embodiments thereof that are illustrated in the appended drawings. Understanding that these drawings depict only exemplary embodiments thereof and are not therefore to be considered to be limiting of its scope, exemplary embodiments will be described and explained with additional specificity and detail through the use of the accompanying drawings in which.

DETAILED DESCRIPTION OF THE EXEMPLARY EMBODIMENTS

Figure 1:
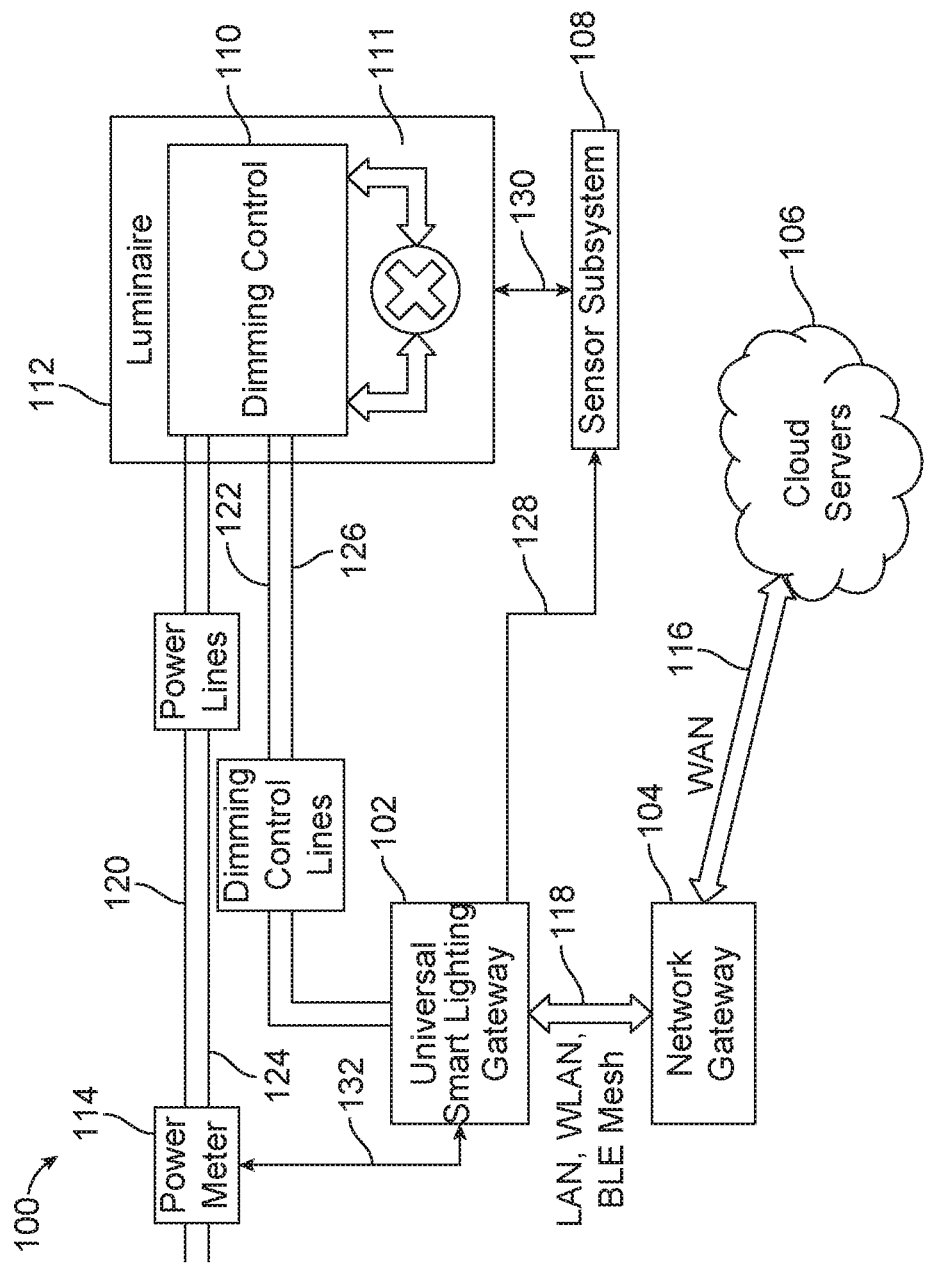
FIG. 1 illustrates an exemplary high-level system diagram of the universal smart lighting gateway according to the disclosure.

The headings used herein are for organizational purposes only and are not meant to be used to limit the scope of the description or the claims. As used throughout this disclosure, the word "may" is used in a permissive sense (i.e., meaning having the potential to), rather than the mandatory sense (i.e., meaning must). Similarly, the words "include", "including", and "includes" mean including but not limited to. To facilitate understanding, reference numerals have been used, where possible, to designate like elements common to the figures.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

Reference will now be made in detail to various exemplary embodiments. Each example is provided by way of explanation, and is not meant as a limitation and does not constitute a definition of all possible embodiments.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are disclosed, it should be appreciated those individual aspects of the disclosed embodiments can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, Non-Volatile Random Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and equivalents and/or successor media, in which the software implementations of the present disclosure are stored.

Figure 2:
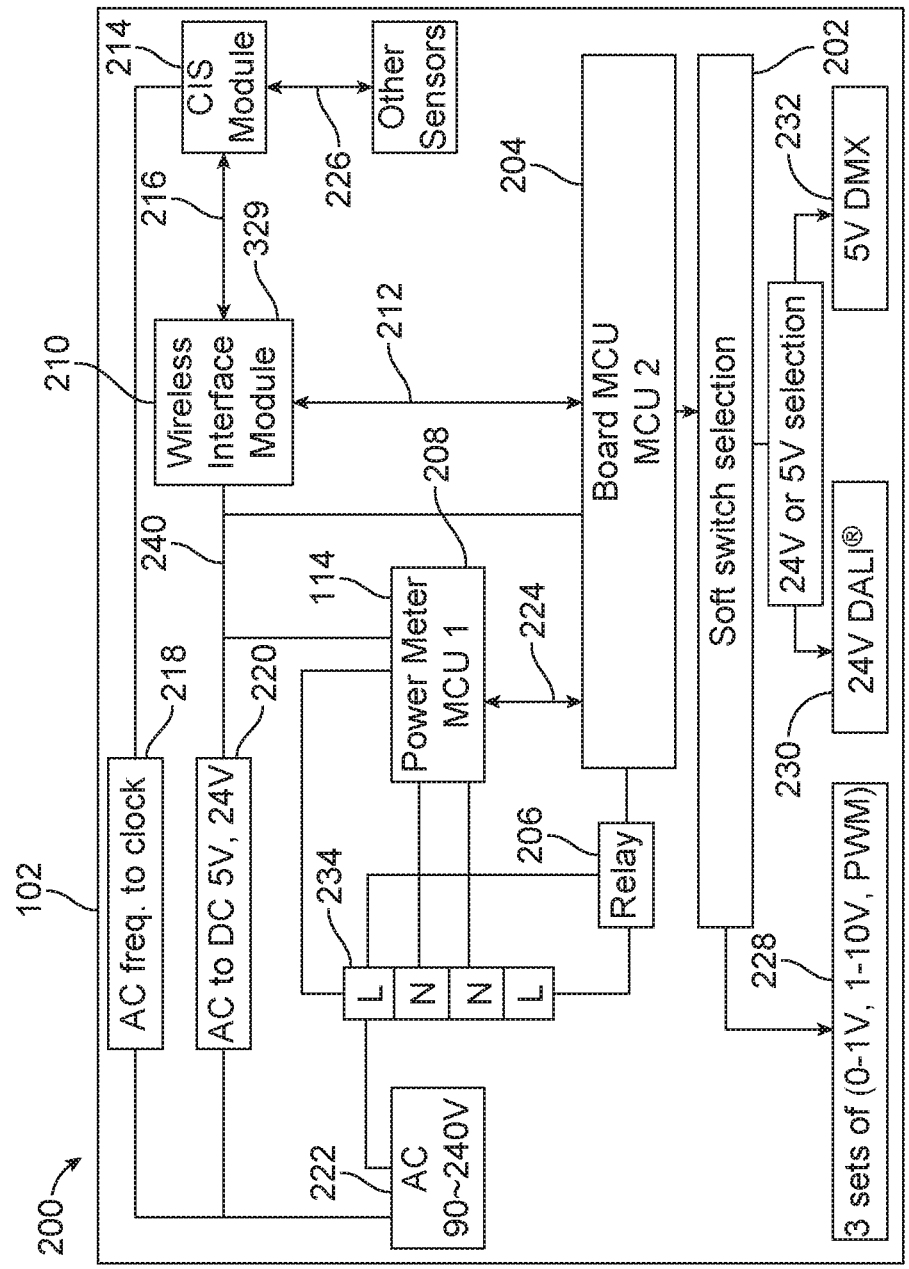
FIG. 2 illustrates an exemplary embodiment of the universal smart lighting gateway box diagram according to the disclosure.
Figure 3:
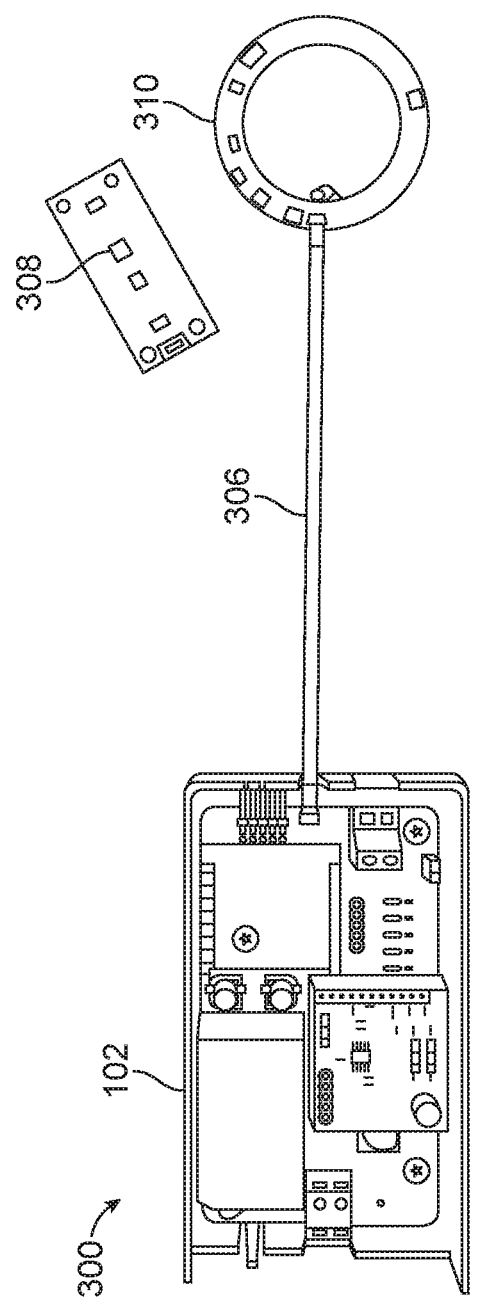
FIG. 3 illustrates an exemplary embodiment of the sensor connection to the luminaire according to the disclosure.

FIG. 1 shows an illustrative embodiment of an exemplary disclosed system 100. FIG. 1 illustrates the environment 100 in which the Universal Smart Lighting Gateway (USLG) 102 resides. The luminaire 112 is a system that can be a single luminaire or multiple luminaires connected with a single common interface to power lines 120, 124 and dimming control lines 122, 126. In the exemplary embodiment of FIG. 1, luminaire 112 includes associated LED 111. There is a power meter 114 that is connected electrically between the gateway 102 and the luminaire 112 on the power lines 120, 124. The power meter 114 is connected to the gateway 102 via the power meter interface 132 and can measure and communicate the electrical power drawn by the luminaire in real time. FIG. 2 demonstrates the power meter 114 connections in more detail. There is a sensor subsystem 108, typically including an up or upward looking sensor, that is connected to the luminaire 112 on one side and to the gateway 102 on the other side via either wired or wireless connections. In the exemplary embodiment shown in FIG. 1, the connection 130 to the luminaire 112 is physical and is not limited to a specific location. The location of the sensor may be different depending on where the sensor must be positioned on a luminaire to detect a lumen (light intensity) output of the luminaire. FIG. 3 demonstrates one embodiment of sensor physical interfaces and connections.

With continuing reference to FIG. 1, servers such as cloud servers 106 in the exemplary embodiment continuously receive performance measurements—including those from sensor subsystem 108—from one or more of gateways 102. For purposes of this disclosure, the terms server and cloud server may be used interchangeably where a cloud server 106 is depicted for the exemplary embodiments but the cloud server 106 may also be a local server, network server, hosted server, or any server consistent with this disclosure. In the exemplary embodiments the cloud servers 106 reciprocally provide each gateway 102 with a table of reading directions that includes the correct sensor reading schedules and expected thresholds/ranges for lumens (light intensity) at specific dimming levels associated with specific luminaires 112. In the exemplary or other embodiments, the gateway 102 and/or sensor subsystem 108 may report changes or deviations from this internal table to the cloud servers 106. Using this method, the system further reduces the amount of information that needs to be transmitted over the gateway backhaul 118. In this way the cloud server applications can control the rate of information sent by the gateway 102 and more accurately predict the LED 111 behavior via the gateway 102.

In the exemplary or other embodiments, sensor readings from the sensor subsystem 108 and other information are sent over the backhaul 118 to the cloud server 106 at random times. Such messages may include a time stamp of the reading and the dimming level. In various embodiments, information from the sensor subsystem 108 or other components may be sent to the server 106 either directly or via gateway 102, and via either wired (physical) or wireless connections. In the exemplary embodiment of FIG. 1, the server is a cloud server 106. In the same or other embodiments, servers may be local servers, network servers, hosted servers, or any other server consistent with this disclosure.

The backhaul interface 118 to the gateway 102 can be wired or wireless Local Area Network (LAN), including possibly one or more of Mesh Bluetooth Low Energy (Mesh BLE), WLAN, ZigBee, and/or Ethernet LAN. In one embodiment this interface is Mesh BLE. The gateway 102 is connected with a network gateway 104 which resides between the local networks to a wide area network (WAN) 116, and via this WAN 116 to cloud computers/servers 106 for operational and management interfaces.

FIG. 2 depicts an embodiment 200 of the USLG 102. FIG. 2 illustrates a soft switch 202 to select between different electrical dimming interfaces for the one or more luminaires 112. This soft switch 202 may be actively used in the search for the correct protocol between the gateway 102 and the dimming control 110 of luminaire 112. The protocol modules 228, 230, and 232 are the software implementation of the dimming protocols that reside in the gateway 102. In one embodiment the supported dimming protocol includes several sets of protocols such as 0V-10V, 1V-10V, Pulse Width Modulation (PWM) 228 protocols over 0V-10V and/or 1V to 10V, a 24V DALI® 230 protocol, and a 5V Digital Multiplex (DMX) 232 protocol. The protocols' algorithms may be implemented in the Micro Controller Unit 2 (MCU 2) 204. According to an embodiment, the MCU 2 204 is powered by the AC to DC 5V, 24V 220 via the power line connection 240. MCU 2 204 is also connected to a power meter 114 via MCU 1 and a Universal Asynchronous Receiver/Transmitter (UART) 224. MCU 2 may also be connected to a Relay 206 and/or a Wireless Interface Module (WIM) 210 via a Serial Peripheral Interface (SPI) bus 212. In an embodiment, the MCU 2 204 is also controlling the Relay 206 that is configured to cut off current to the luminaire 112 upon a decision by the MCU 2 204. The power cutoff can be used to disconnect power from the controlled luminaire subsystem (See FIG. 1). In an embodiment the Wireless Interface Module (WIM) 210 is implemented as Bluetooth Low Power (BLE) device using Mesh BLE protocol to connect with other devices as well having SPI bus 212 and Inter-Integrated Circuit two-wire serial interface bus ("TWSI") 216. The WIM 210 may be connected to a sensor subsystem that may include a Camera Interface System (CIS) 214, which in the exemplary embodiments may include an environment sensor and, for example, a Red-Green-Blue (RGB) or Yellow-Red-Green-Blue (YRGB) sensor combination device and other sensors. The CIS module 214 can be extended via Two-Wire Serial Interface ("TWSI") bus 226 with other sensor modules. The CIS module 214 requires a clock, which is received via the AC Frequency to clock module interface 218. The WIM 210 requires power, which may be received via the AC to DC 5V to 24V 220 via power interface line 240. The AC Power 90V-240V 222 may be relayed to the MCU 2 204 and from it to the soft switch 202 for power selection for the dimming protocol interfaces. The AC Power 222 is also relayed to the power meter 114 which measures all power delivered to the luminaire. The LNNL 234 depicts the physical electrical line connections.

FIG. 3 depicts an exemplary embodiment 300 of the sensors—CIS module 308 or 310—and the physical interface with the gateway 102 via a Two-Wire Serial Interface (TWSI) connection using a 6-pin FPC cable and connector 306. The CIS module is physically connected somewhere on the luminaire. A CIS module 308 is a linear module that can be adopted to fit on devices that require a linear fitting, while the CIS module 310 is circular and is designed to fit circular luminaire modules. The exemplary disclosed embodiments do not limit the type of hardware/wire/bus interfaces between the gateway 102 and the sensor subsystem 108 or devices (CIS module 308, 310), e.g., the number of wires, the type of wires or bus connectors. The connections may be, for example and without limitation, analog interface connectors and/or electrical/digital bus connectors of any kind. The connections may be wireless connections operating according to any wireless protocol.

The CIS 308 and/or 310 may be provided with at least two or more sensors; one sensor is dedicated to environment sensing and is configured to face away or in a downward direction from the luminaire, while a second sensor is configured to face in an upward direction towards the luminaire directly. For purposes of this disclosure, the first sensor is referred to as the environment or downward looking sensor and the second sensor is referred to as the upward looking sensor, color sensor, or upward looking color sensor.

The environment sensor is configured to monitor the environment in which the luminaire(s) 112 or light source are installed and may be a low resolution imaging sensor which could be an array of sensors combined into a low resolution imaging device, or a single Application-Specific Integrated Circuit (ASIC) that is an imaging sensor. The environment sensor is measuring environmental parameters (discussed further below) and is/are facing away from or in a downward direction from the luminaires.

The environment sensor includes at least three different sensors in an exemplary embodiment: a low-resolution image sensor, an ambient light sensor, and a temperature sensor. In an exemplary embodiment of this disclosure, the environment sensor may include several sensors or may be a single sensor ASIC provided the environment sensor is capable of collecting enough information to measure applicable environmental parameters such as, among other things, ambient light and temperature of the environment in which the luminaire(s) 112 are installed that the server 106 will need to calculate, among other things, luminaire light intensity and adjustments, lumen degradation, and/or luminaire half-life and/or end of life. Without limitation, this disclosure collectively refers to all sensors included in the environment sensor as the "environment sensor". Further, without limitation, in the exemplary or other embodiments the environment sensor may include any number of sensors consistent with this disclosure; for example, humidity sensors, motion sensors, infrared sensors, "footfall sensors" (to measure the number of people passing through or present in a given environment), etc.

The upward looking color sensor or combination of sensors can measure multiple color channels (e.g., Red, Green, Blue, and/or Yellow in certain embodiments) as they directly face the luminaires. The upward looking color sensor is used to measure both the color content of a light source and light intensity. Every gateway 102 is connected to at least one upward looking sensor that provides the light intensity of a luminaire 112 regardless of power or dimming level. This allows for an accurate maintenance of a lumen level when the luminaire capacity is diminishing over time as well as during changes between different standards in the dimming control. For example, the system obviates using the dimming level to calculate light intensity or lumen level because the upward looking sensor provides the light intensity of the luminaire 112 at the luminaire 112, for direct control. The server 106 in the exemplary embodiment can thus correlate the dimming level of the particular luminaire to achieve the desired light intensity.

In an aspect, calibration of the color sensor(s) may be such that the depreciation of a sensor follows a known graph, which was studied for the specific color sensor (e.g., complementary metal-oxide-semiconductor (CMOS)). The sensor readings may also be normalized over time by plotting successive readings. Thus, two different color CMOS sensors that are attached to the same luminaire in different physical attachment locations on the fitting may have different absolute light intensity readings, such as for red, green, blue, and/or yellow based on their relative positions, yet the normalized values of the percent change in light intensity read by each individual sensor will be accurate. For example, red intensity is read respectively as x1 and y1 at each of two sensors at time t1 and, at t2, x2 and y2. In the example, x2/x1=y2/y1+w, where w<<1 and each sensor reads an accurate change in red intensity between t1 and t2. Therefore, the exemplary systems and methods can correlate an exponential relationship between color intensity and lumen intensity of the LED, via normalization. This relationship may be known and/or calculated by the cloud server 106.

Figure 3B:
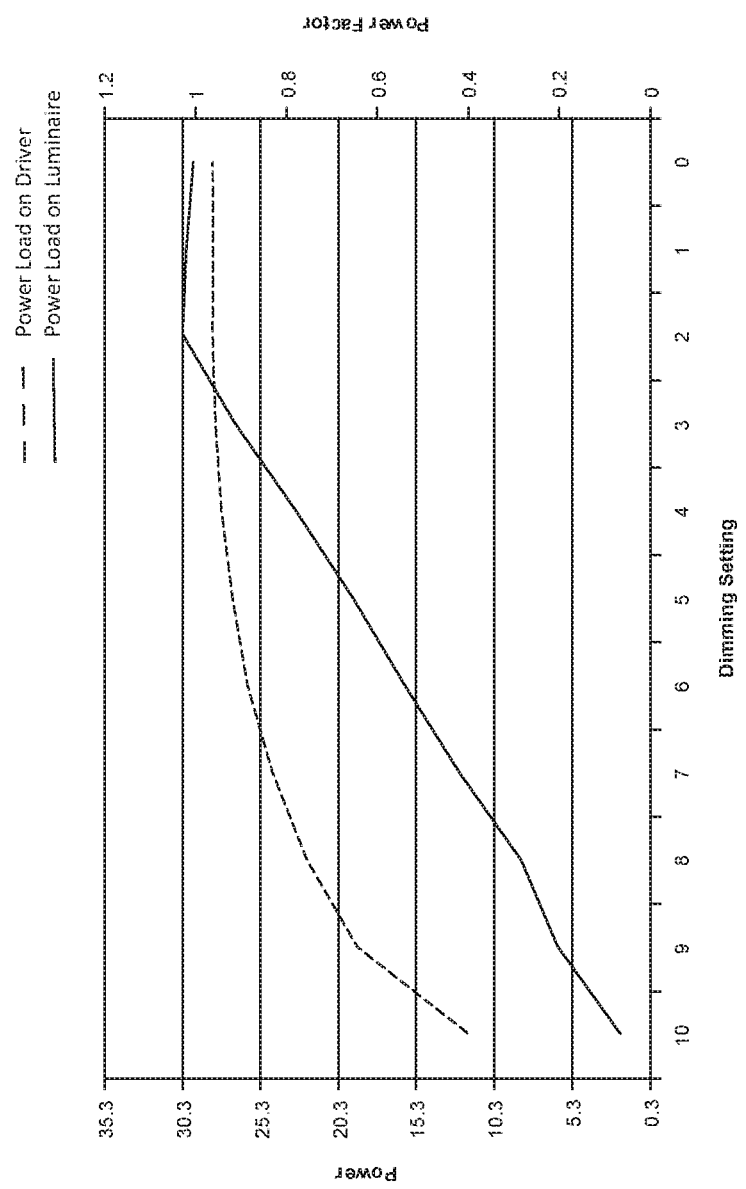
FIG. 3B is graph showing power factor versus power consumption for a luminaire, according to an aspect.

FIG. 3B shows a representative plot of the power factor and power load of a luminaire driver and luminaire combination against the dimming setting of the luminaire, where 0 is minimum dimming (i.e., the luminaire is at maximum brightness) and 10 is maximum dimming (i.e., the luminaire is at minimum brightness). The power factor is the sum of the power load on the luminaire and the driver. FIG. 3B also shows the associated power consumption at each dimming setting. In general, as shown in FIG. 3B, the power factor significantly decreases as the dimming level of the luminaire increases and the associated power consumption decreases. The representative graph shown in FIG. 3B indicates that the driver becomes inefficient at lower dimming levels because the power load on the driver is staying relatively constant while the amount of light varies according to the different dimming levels. The details of the depicted correlations will likely vary between different brands and types of luminaires, and even between luminaires of the same brand and type due to manufacturing tolerances.

FIGS. 3C-3G depict various representative dimming curves for a luminaire/luminaire driver combination including a dimming control/circuit. Unlike a switching circuit where a light level can be toggled directly between 0% output (off) to 100% (on), a dimming circuit can vary the light output between minimum and maximum outputs. The light level produced at different dimming levels depends on a number of factors including, but not limited to, the brand and type of the luminaire and/or luminaire driver, the conditions of the environment in which the luminaire is installed, and the dimming protocol according to which the luminaire driver is operating. For example, the dimming devices may not necessarily dim to 0% output, such as in the case of 1-10V dimmers, which typically require a switching circuit to reach 0% output. Various luminaires and/or luminaire drivers on the market may state the lowest dimming value that the luminaire or luminaire/driver combination can output according to their dimming protocol, which may be one or more of any number of, e.g., analog or digital LED lighting control protocols. Each such protocol will dim the lighting in a particular way and the dimming profile may be represented graphically as dimming level versus light output. Certain representative dimming curves are shown in FIGS. 3C-3G and explained further below. In FIGS. 3C-3G, dimming levels increase in a direction from 0 to 100; that is, a dimming level of 0 is a minimum dimming (maximum brightness of the luminaire) and a dimming level of 100 is a maximum dimming (minimum brightness of the luminaire).

Figure 3C:
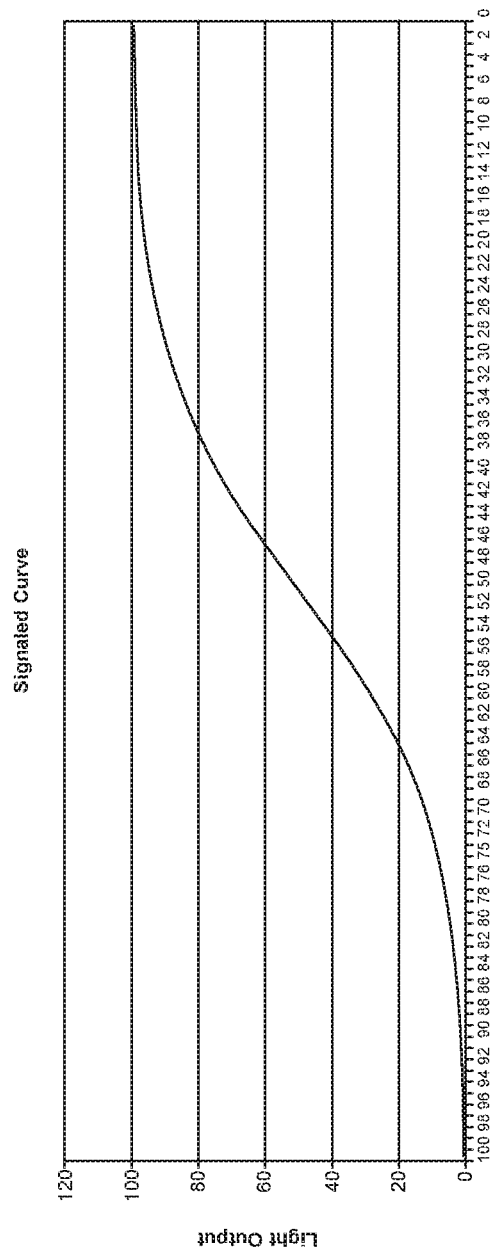
FIG. 3C is graph showing an S dimming curve, according to an aspect.

FIG. 3C shows Signaled (S) Curve dimming. A representative S Curve will be either a digitally-set dimming curve or the result of a PWM dimming protocol, e.g., for an LED light source. PWM dimming is typically found in DMX lighting control and/or systems where the dimming control is driven by a Triode for Alternating Current (TRIAC), Metal-Oxide-Semiconductor Field-Effect Transistor (MOSFET), or a similar gate/timer device for high voltage/current LEDs. PWM has a greater biological effects of flicker due to the switching frequency of the PWM. For example, the flicker may cause psychological issues for humans and growth problems in plants.

The S Curve (sigmoid curve) is calculated as follows:

$$Y = \frac{100}{1 + e^{-0.1(x-50)}} \quad \text{(eq. 1)}$$

where:

$X$ = Dimming value (%)

Figure 3D:
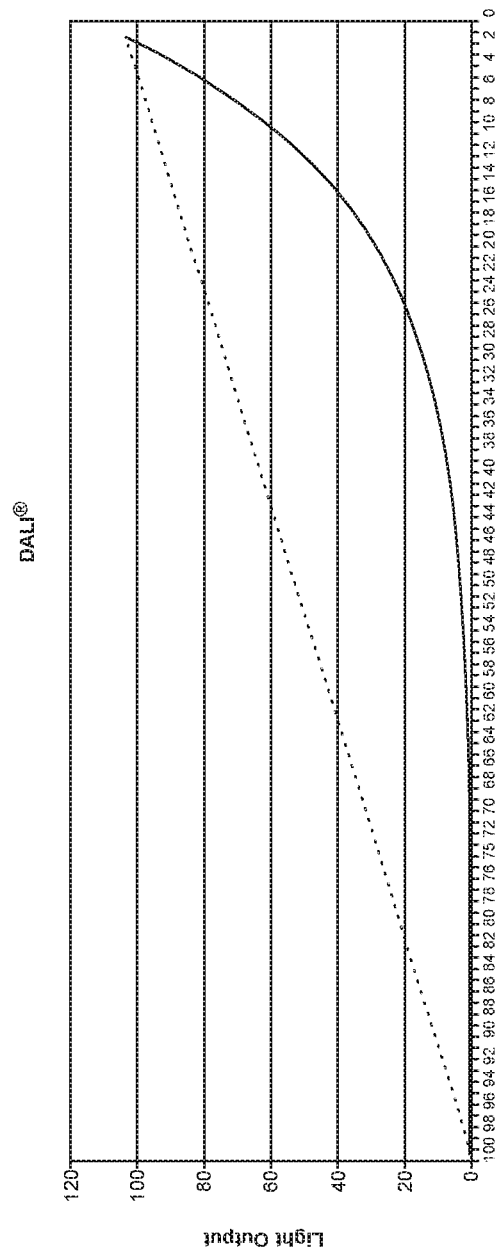
FIG. 3D is graph showing a DALI® logarithmic dimming curve, according to an aspect.

FIG. 3D shows a DALI® dimming curve according to the DALI® Standard (International Electrotechnical Commission (IEC) 62386). DALI® dimming commands are sent to the LED driver as a digital 8-bit number and follow a logarithmic dimming pattern. The logarithmic approach factors in an aspect of the Weber-Fechner Law: to the human eye a dimming curve such as shown in FIG. 3D will be perceived as a linear increase of light output, as represented by the dotted line. To normalize the DALI® dimming commands against other dimming curves, the 8-bit command may be converted to a percentage dimming value. The DALI® Logarithmic Curve is calculated as follows:

$$Y = 10^{\left(\frac{n-1}{253/3}\right)} \quad \text{(eq. 2)}$$

where:

$$n = \frac{X}{100} \times 254 \quad \text{(eq. 3)}$$

$X$ = Dimming Value (%)

Figure 3E:
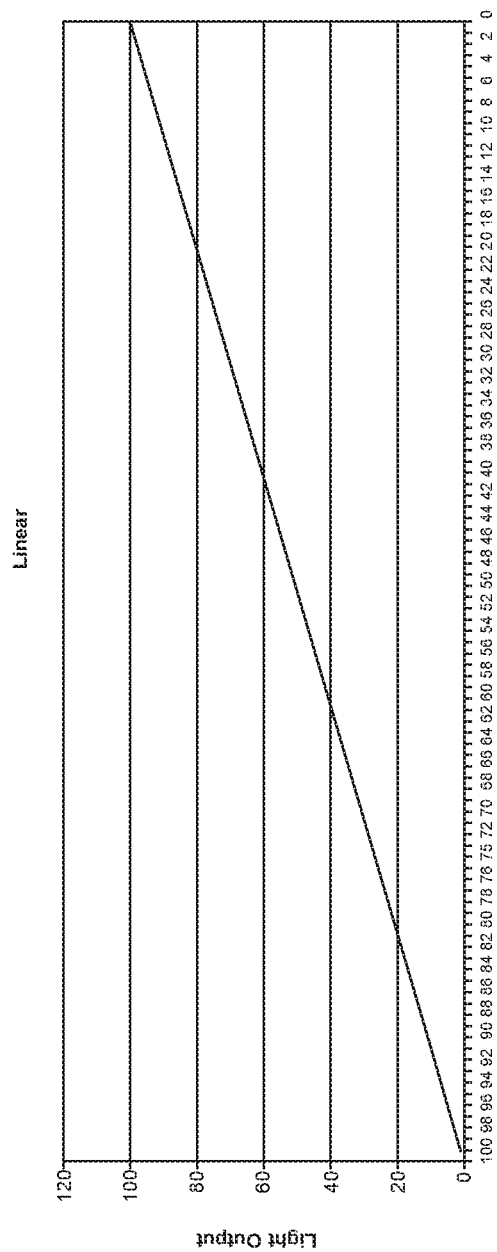
FIG. 3E is graph showing linear dimming curve, according to an aspect.

FIG. 3E shows a representative linear dimming curve. A linear dimming curve as shown in FIG. 3E is calculated as follows:

$$Y = X \quad \text{(eq. 4)}$$

where X=Dimming Value (%)

Figure 3F:
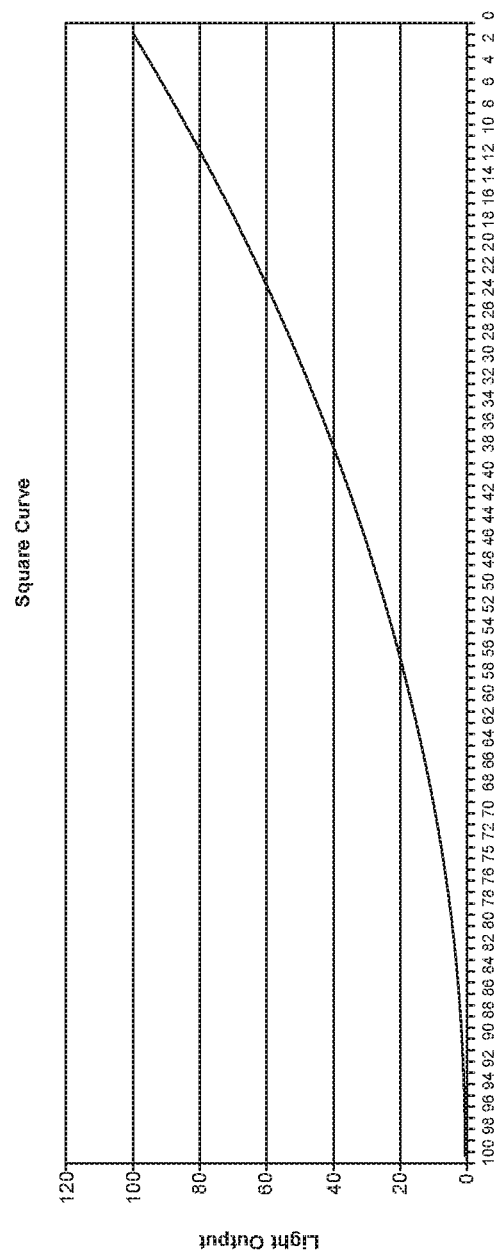
FIG. 3F is graph showing square dimming curve, according to an aspect.

FIG. 3F shows a square curve dimming profile. A square curve as shown in FIG. 3F is calculated as follows:

$$Y = \frac{X^2}{100} \quad \text{(eq. 5)}$$

where $X$ = Dimming Value (%)

Figure 3G:
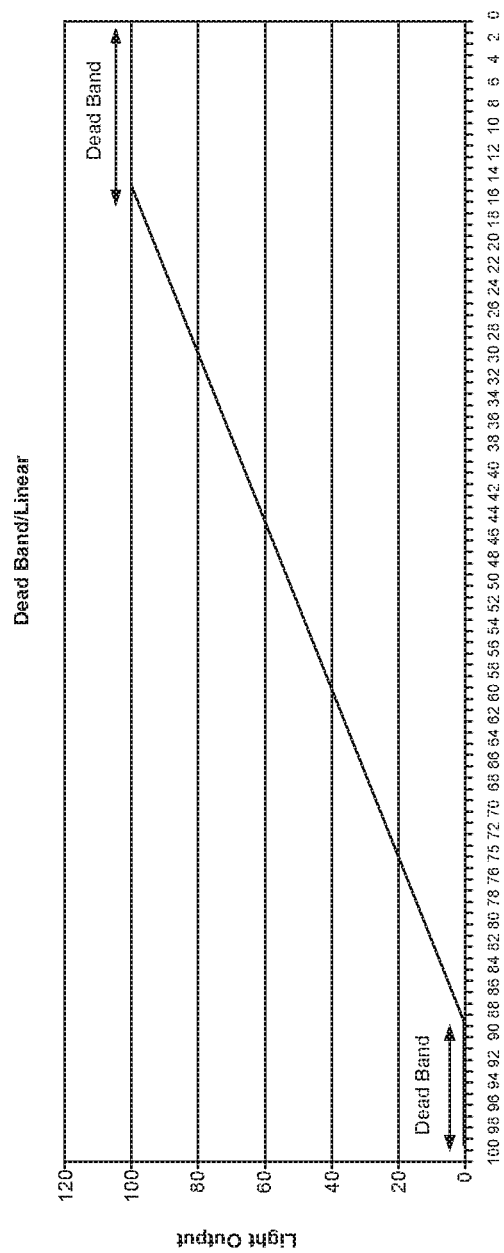
FIG. 3G is graph showing dead band versus dimming value, according to an aspect.

FIG. 3G shows a representative linear Dead Band dimming curve. Dead Band refers to dimming levels at which the dimmer is adjusted but there is no (actual or perceived) change in brightness of the luminaires/LEDs. As shown in FIG. 3G, Dead Band can occur at both the low and high end of the dimming range. Dead Band may also occur in the middle of the dimming range (referred to as Dead Travel), although this is not depicted in the representative curve shown in FIG. 3G. Unintended Dead Band/Travel may be the result of any number of factors affecting the electrical and mechanical aspects of the luminaire/driver including, but not limited to, the brand and/or type of luminaire/driver, conditions in the environment in which the luminaire/driver is installed, voltage of the power source supplying the luminaire/driver, and the elapsed life and number of dimming cycles that the luminaire/driver has experienced. Dead Band and/or Dead Travel may affect analog or digital dimming controls including the DALI® and 0-10V LED drivers mentioned above. Dead Travel is more typical of resistive dimming devices but can be found in digital systems dependent on driver performance/quality.

Within a lighting installation, many luminaires having a variety of different dimming curves may be present across the same or different spaces. Accordingly, identifying and normalizing all the dimming curves will be essential to ensuring smooth lighting installation and operation. For example, maintaining a desired light level or color temperature in a room with multiple luminaires depends on correlating changes to the overall light level or color temperature to a potential change in the dimming level of any particular luminaire. As shown in FIGS. 3C-3G, the same percentage change in dimming level for different luminaires having different dimming curves may result in incongruous changes in light level or color temperature contributed by each luminaire.

There are a variety of fixed dimming curves available and different control protocols and/or LED drivers that will follow their manufacturer's set profiles. The curves in FIGS. 3C-3G are illustrative and the nature of a dimming curve for any particular luminaire or luminaire/driver combination may not follow those figures. For example, some device(s) may have a driver-specific, irregular curve as a result of resistive and/or TRIAC dimming of LEDs. As described further below, the exemplary disclosed embodiments normalize the various dimming curves of luminaires/drivers across a lighting system and therefore provide dynamic control over each luminaire/driver and the spaces in which they are installed to maintain, e.g., light levels or color temperature and maximize the life of the luminaires/drivers.

Figure 3H:
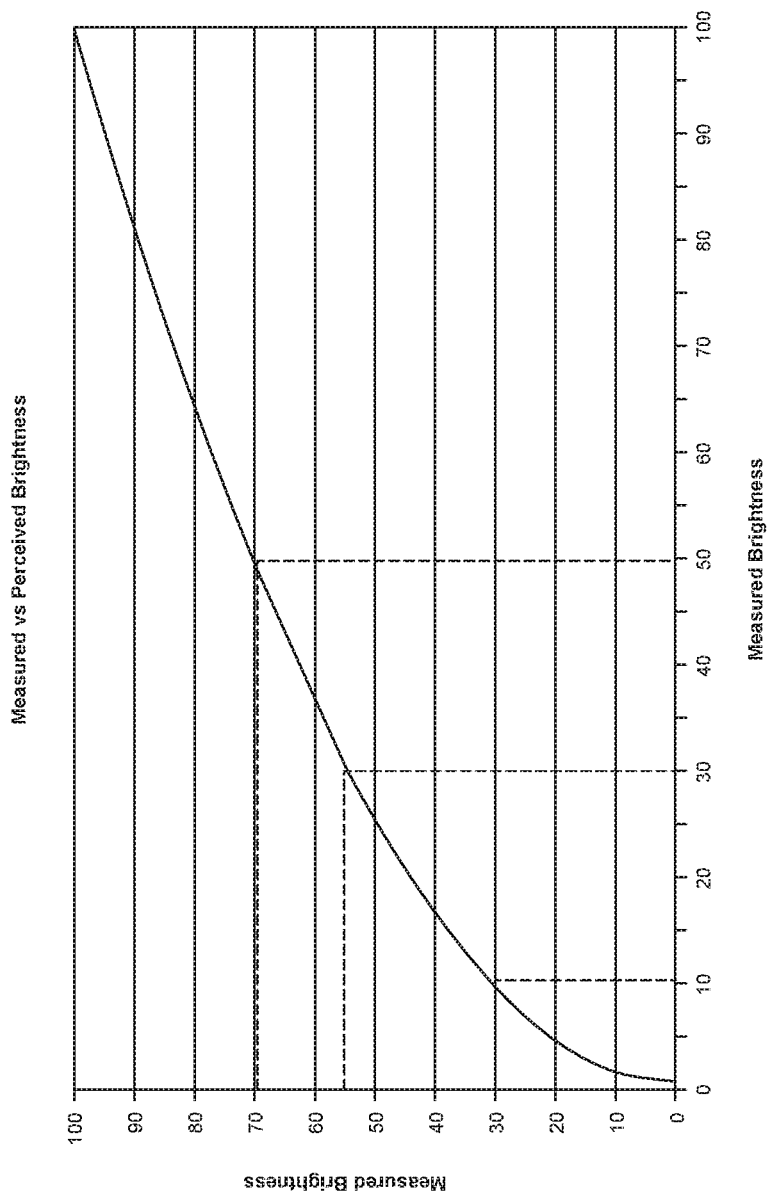
FIG. 3H is graph showing measured versus perceived brightness, according to an aspect.

With reference now to FIG. 3H, a representative correlation between measured and perceived brightness is shown. The human eye does not respond linearly to light. If a luminaire utilizes a true linear dimming curve, the typical observer will see significant changes in brightness during the first 50% of the dimming range, e.g., as dimming is decreased from 100%, but fewer changes in brightness during the last 50% of the dimming range. The relationship between measured versus perceived brightness as shown in FIG. 3H, is approximately:

$$PerceivedLight\,(\%) = \sqrt{\frac{MeasuredLight\,(\%)}{100}} \quad \text{(Eq. 6)}$$

Figure 3I:
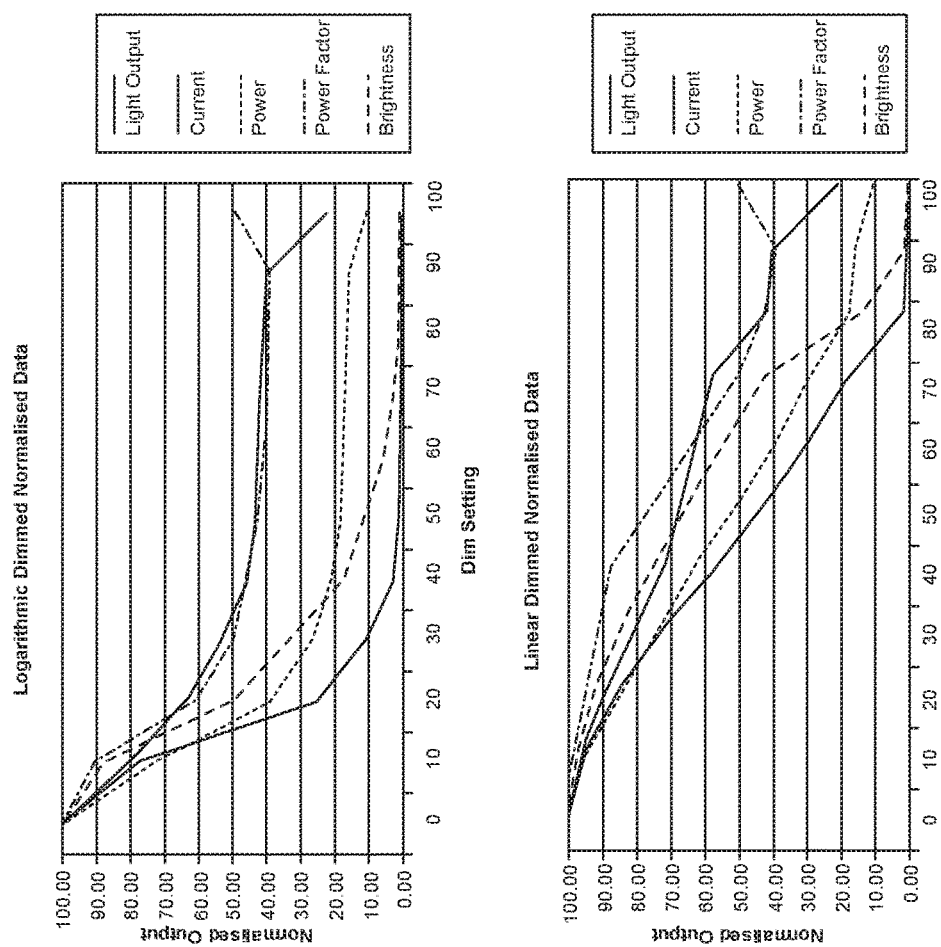
FIG. 3I is graph showing logarithmic versus linear dimming test, according to an aspect.

With reference now to FIG. 3I, a test was conducted using an eldoLED-brand LED driver that can be programmed to output both logarithmic and linear dimming curves to view the differences between logarithmic and linear dimming as shown in FIG. 3I. Luminaire, power monitoring and control devices all remained the same between the two dimming protocols. All values were normalized for representation on a single plot, and perceived brightness was calculated and added to the plots. Analysis of the perceived brightness versus power consumption was conducted to ascertain the efficiencies of each of the dimming curves and a ratio was calculated as follows:

$$Light/PowerRatio = \frac{NormalisedPerceivedBrightness}{NormalisedPowerConsumption} \quad \text{(Eq. 7)}$$

Table 1, below, summarizes the results of the light/power analysis at various dimming levels for each of the logarithmic and linear dimming curves.

TABLE 1

| Dimming | Log Light/Power Ratio | Linear Light/Power Ratio |
| --- | --- | --- |
| 0 | 1.000 | 1.000 |
| 10 | 1.210 | 1.025 |
| 20 | 1.292 | 1.105 |
| 30 | 1.268 | 1.162 |
| 40 | 0.820 | 1.198 |
| 50 | 0.623 | 1.306 |
| 60 | 0.324 | 1.382 |
| 70 | 0.162 | 1.460 |
| 80 | 0.094 | 0.762 |
| 90 | 0.096 | 0.099 |
| 100 | 0.000 | 0.000 |

Figure 3J:
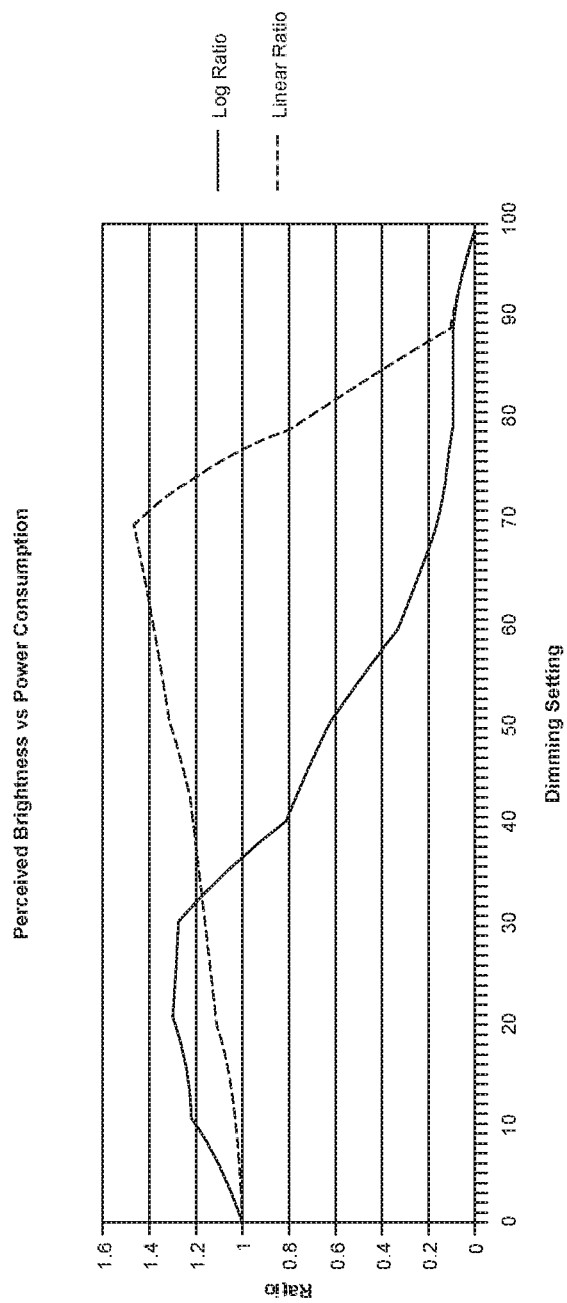
FIG. 3J is graph showing perceived brightness versus power consumption, according to an aspect.

Further analysis of the two representative dimming curves as shown in FIG. 3J shows that a log dimming curve is slightly more efficient (more light per unit power) in the lower regions of dimming but a linear curve has more efficient performance in the higher dimming region for this particular driver. Nonetheless, each curve may be suited for particular applications. For example, hospitality and retail spaces may find the smooth high-end dimming of the logarithmic curve beneficial over the drop-off in light observed for the linear curve.

In typical commercial lighting installations, driver dimming/mapping will either be linear or logarithmic. Other types of dimming curves are typically found in particular applications such as entertainment lighting. Linear curves are typically more efficient while logarithmic curves allow for a smoother curve and feel to the dimming. In the disclosed exemplary embodiments, the power meter 114 and up looking color sensor may asses a luminaire/LED driver's dimming capabilities and modify the driver's dim settings using a software interface to achieve a desired light output, color temperature, efficiency, etc. correlated to other luminaires/LEDs in the lighting system. In an exemplary smart lighting installation, the dimming control signal will be a digital 0-100 value representing the dimming level or percent (e.g., with zero representing the minimum dimming level (maximum brightness) and 100 representing the maximum dimming level (minimum brightness)) and this will be consistent across all dimmers. Accordingly, the exemplary disclosed embodiments provide enhanced control over uncorrelated manual resistive-type dimmers that have manufacturing inconsistencies and digital dimmers with unique curves. The exemplary software interface is capable of characterizing light output, power, current, and power factor at all dim levels for all luminaires within a control group; this allows the dimming curve, dead band, and energy consumption of the luminaire to be identified. Using this data, the software interface can remove any dead band from the dimming range and set the measured brightness to follow a desired curve such as, for example and without limitation, linear perceived brightness, best fit for energy efficiency, etc. As the user then dims from 0-100, there will be a linear decrease in brightness.

The dimming range mapping can also take into consideration any global max dim values set for a product or group of products. For example, if an estate manager wanted to save 5% on energy across a lighting system, this may require more than a simple 5% change to each luminaire's dim settings because, as noted above, the same change in dimming percent across multiple luminaires may not result in equivalent changes to light output, power consumption, etc. due to the potential differences between each luminaire's dimming curve. In the case of disclosed curves in FIGS. 3I and 3J, a 5% dimming change for a logarithmic curve may result in approximately 14% energy savings, while the linear curve may realize only approximately 3% energy savings. As a further example, a simplified lighting system for a space may include two luminaires having different maximum brightness values and drivers having different dimming curves. Without correlating the light output and dimming curves of the two luminaires/drivers, the overall illumination in the space will not linearly follow corresponding changes to either or both luminaires because each luminaire is contributing to the overall illumination according to a particular maximum brightness and dimming curve. On the other hand, in the exemplary disclosed embodiments the dimming curves of luminaires 112/drivers across a lighting system are correlated such that, in part, the overall light output, perceived brightness, color temperature, power consumption, etc. of a group of luminaires 112 can be controlled across the group and in view of any changes to associated parameters of any individual luminaire 112.

Further, and as described further below, as the luminaire and/or driver ages, the dimming range mapping will likely require updating to account for the luminaire degradation and driver performance. The iterative dimming range mapping at various times throughout the life of the luminaire/driver may also provide data for predicting a half-life or end of life for the luminaire/driver, based on, e.g., the rate of degradation. Other factors such as the occurrence of dead band or dead travel may be used as additional metrics for predicting failure of the driver. The exemplary disclosed embodiments may be configured to use such information in adjusting the dimming level and/or dimming protocol of a luminaire/driver to maximize the life of the component.

Applying the previously mentioned software implementation to adjust the dimming characteristics of a driver can be applied to both a retrofit WIM and integrated core module situation. The software may be configured to handle the dimming curves for multiple LED lighting devices/drivers and thereby simplify the system design. Typically, one type of driver may be used with any number of combinations of luminaires from different manufacturers. The load of the luminaire on the driver will differ from product to product, which will in turn change the performance of the dimming of the system. The software implementation may adjust and compensate the dimming to the load attached to each driver. The software implementation may also calculate the most efficient dimming curve(s) to use with a particular luminaire/driver, as particular drivers may show different efficiencies depending on the dimming curve(s) that they are handling.

In the exemplary or other embodiments, manual control may be substituted for certain software-based implementations where consistent with this disclosure.

Figure 4:
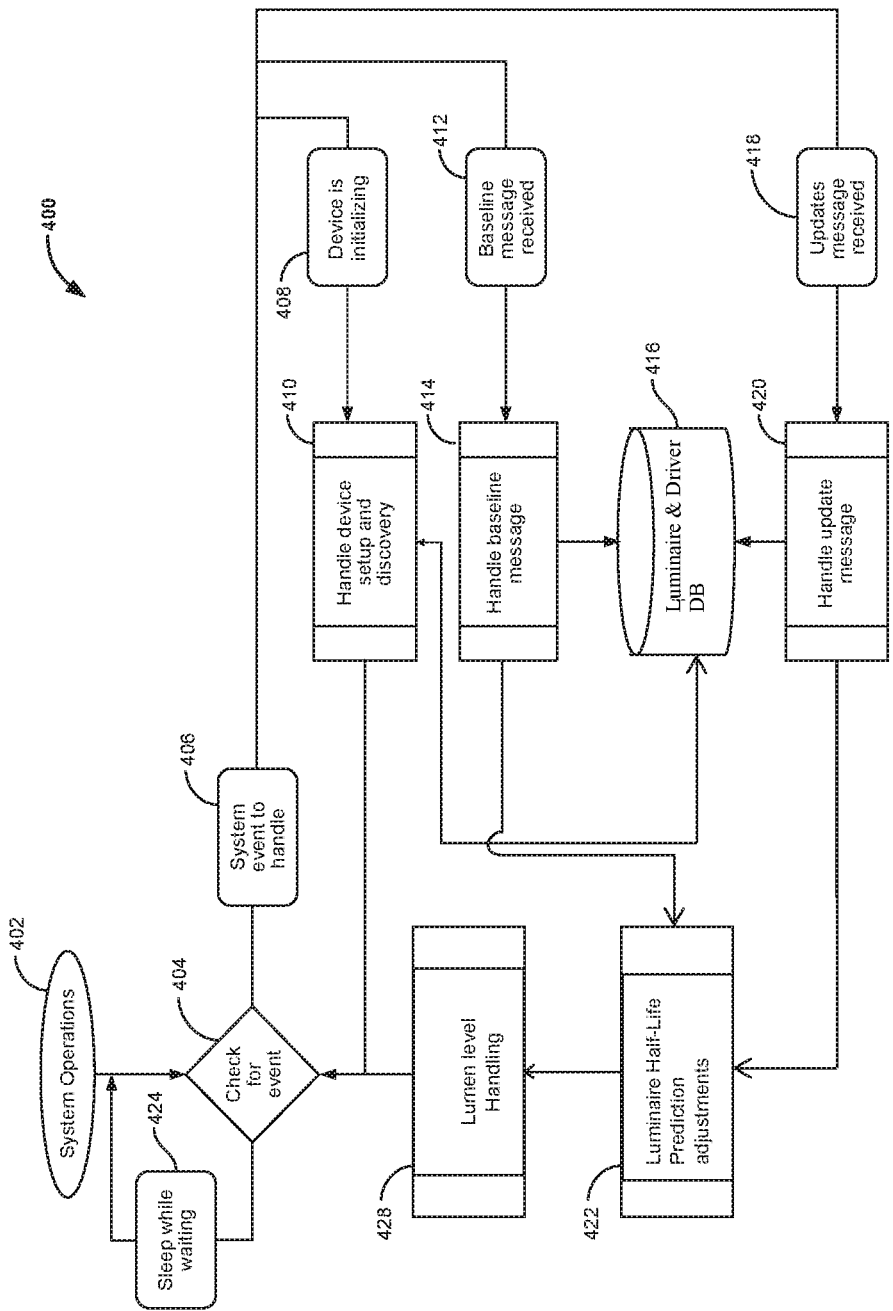
FIG. 4 depicts an exemplary embodiment of the system procedural global event handling.

FIG. 4 depicts one exemplary embodiment 400 in which the system operates at a high level. The cloud server 106 is in a reactive mode, checking regularly for events 404. FIG. 4 depicts three different types of exemplary events 408, 412, and 418. The first event 408 is "Device is initializing" which is handled by the "Handle device setup and discovery" 410. The details for these interactions are described in FIG. 5. The second type of event is a "Baseline message received" 412. A Baseline Message may include, for example and without limitation, full sensor readings from sensor subsystem 108, power level readings from power meter 114, and the current dimming state for the luminaire 112. The handling of a Baseline Message is described in FIG. 6 for the gateway 102. Finally, a third type of event is associated with an "Updates message received." Handling 420 for the Updated message 418 is described in FIG. 7. An Updates Message may include, for example and without limitation, changes or differentiations from a previous message set, where a message set can be a baseline message set or any of the updates message set relating to, e.g., sensor readings, light intensity of the luminaire 112, power consumption of the luminaire 112, dimming level of the luminaire 112, etc. After handling incoming messages of any type, e.g., Baseline messages or Updates messages, the corresponding updates or changes (as discussed above) are recorded in a Luminaire and Driver Database (DB) 416. The handling of device setup and discovery is also recorded in the Luminaire and Driver DB 416 as depicted in FIG. 6.

After the handling of Baseline 412 and Updates 418 messages, the exemplary system at the server 106 will predict the luminaire half-life, or end of life, or adjust its previous predictions 422. At step 428, the system lets the lumen level handling control process know that an event has occurred, which may have changed the lumen level for a specific luminaire 112. Step 428 may entail adjusting the dimming level to adjust the lumen level of the luminaire 112 and is described in further detail in FIG. 15. Changes in the dimming level, schedule, or protocol of a luminaire will have impacts on its predicted half-life; therefore, over time and based on usage, the predictions will change based on the information that is received by the server 106 and Luminaire and Driver DB 416 over time.

At step 402, system operations initiate. At step 404, the system (i.e., the cloud server 106) checks for events that need to be handled. If there are events that need to be handled by the system, the operation goes to step 406. If there are no events that need to be handled by the system, the operation goes to step 424 in which the system goes into a waiting, or "sleep" mode.

Figure 5:
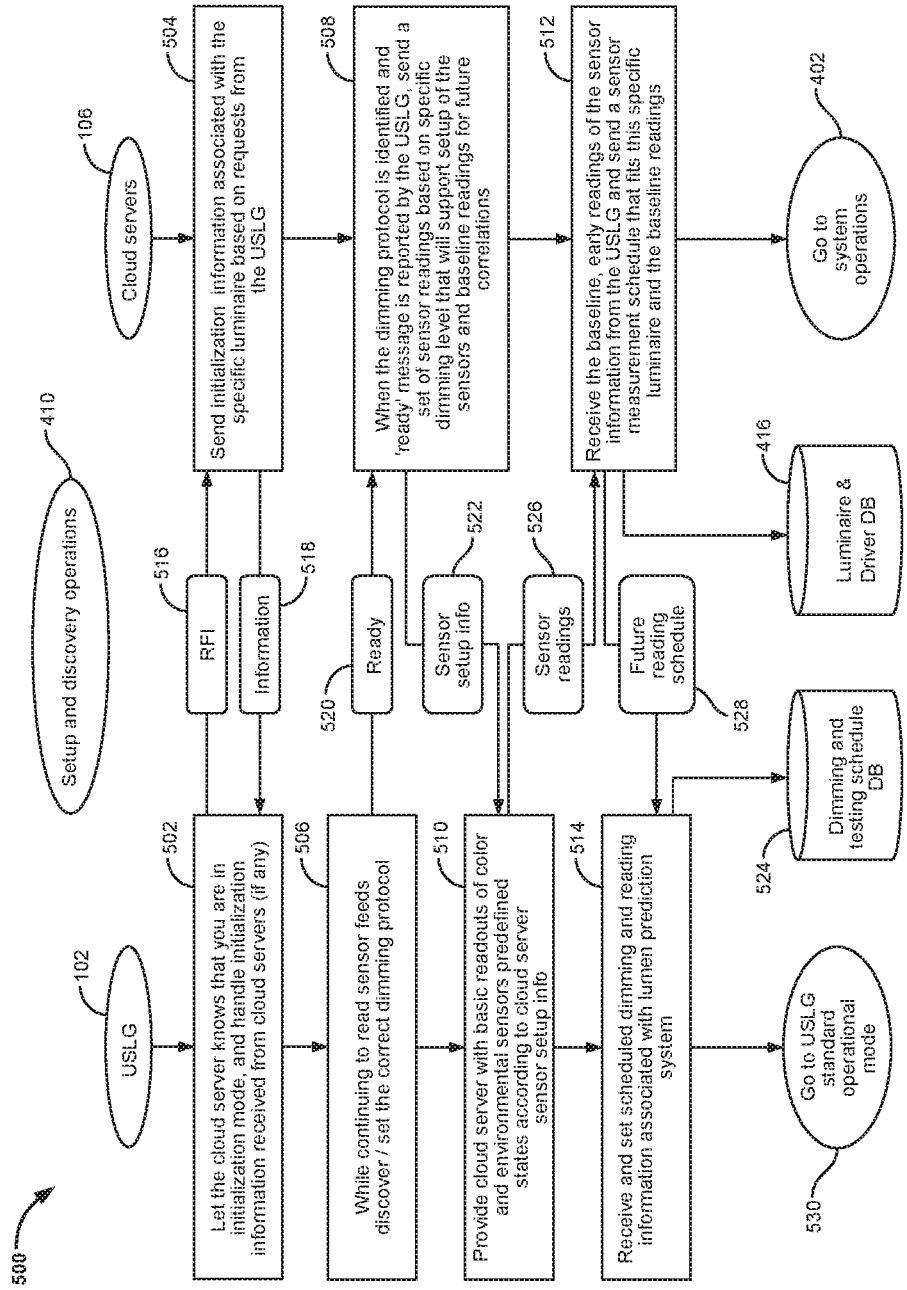
FIG. 5 depicts an exemplary embodiment of the system handling of device setup stage.
Figure 6:
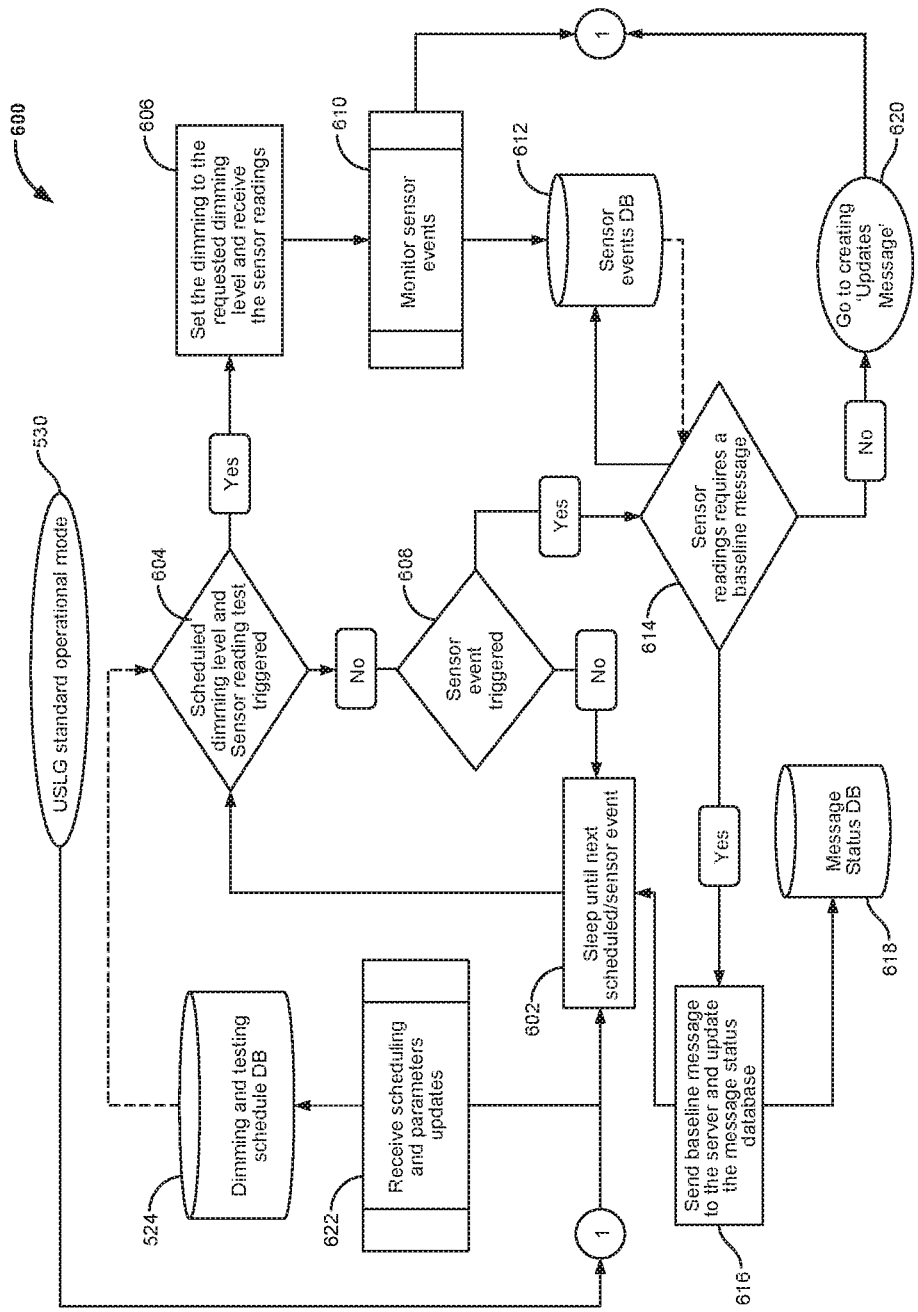
FIG. 6 depicts an exemplary embodiment of handling a gateway Standard Operational Mode.

FIG. 5 depicts an embodiment 500 of the system handling of device setup and discovery operations. The first event after turning on a gateway 102 will be a request for information (RFI) 516 from the gateway 102 to the cloud server 106. The initialization information 518 may include, for example and without limitation, information regarding the type of luminaire 112, applicable dimming profile for the luminaire 112, lumen (light intensity) ratings for the luminaire 112, etc. Based on the information 518, the gateway 102 will set the appropriate dimming protocol for the luminaire and send a Ready message 520 to the cloud server 106. The Ready message 520 includes information identifying the luminaire 112, its dimming protocol, and sensor information as collected during the dimming protocol test/discovery 506 by the gateway 102. The cloud server 106 will respond with dimming and sensor information 522 associated with the setup of the sensors for baseline and for tune-up 508. The gateway 102 will then collect the readings of the sensors and set the luminaire to the baseline or predefined states 510 of, for example and without limitation, the light intensity and dimming level of the luminaire 112. The information collected is sent to the cloud server as part of Sensor Readings message 526. The cloud server 106 uses the Sensor Readings information 526 from the gateway 102 to store the baseline states and determine a sensor measurement schedule 512 for the luminaire 112. The cloud server 106 then sends back to the gateway 102 any additional information that has been gathered since establishing the baseline states and a schedule for dimming and measuring the luminaire 112 as a Future Reading Schedule 528. The cloud server 106 will commensurately update the Luminaire and Driver DB 416 with information regarding the luminaire 112, such as discussed above, and continue to System Operations 402. The gateway 102 receives and sets the scheduled dimming and reading information for the luminaire 112, records the same in the Dimming & Testing Schedule DB 524, and continues to the Standard Operational Mode 530 (FIG. 6).

In another aspect, the gateway 102 can be controlled such that it executes measurements, or instructs the sensor subsystem 108 to execute measurements, for example and without limitation, only when environment conditions are in a certain range and/or when the dimming level of the luminaire 112 is in a certain range. These instructions and other control of the measurement schedules and protocols are provided to the gateway via the cloud servers 106 which are connected to the gateway 102 in the exemplary embodiment shown in FIG. 1.

FIG. 6 depicts an embodiment 600 of the handling of the gateway 102 Standard Operational Mode 530. The gateway 102 is in a waiting, or "sleep" mode, until a scheduled or sensor event is initiated 604. The events can be one of two types: the first type is associated with an existing dimming level and sensor reading test 604, e.g., at a specific time when a specific dimming level is set for the luminaire 112 and sensor readings are taken by sensor subsystem 108. For this event, the gateway 102 will set the dimming level to the requested dimming level and receive the sensor readings 606. The sensor events are monitored for storage in the Sensor Events DB 612. The second type of event is a sensor reading 608 that is present and needs to be read and processed. In one embodiment, the gateway 102 does not automatically initialize to process or handle events that are not planned for, e.g., scheduled. After the initialization of the gateway 102, the gateway 102 will receive a scheduling message from the cloud servers 106. This message will include parameters to populate the dimming & test schedule Database 524. The Receive scheduling and parameters updates 622 process will update the Dimming and Testing schedule database 524 and also refresh the sleeping timer to wake on the next appropriate test schedule. If or when a scheduled test is triggered, the gateway sets the dimming to the requested light percentage and the monitoring sensor event 610 process is updating the sensor events database 612 and goes to sleep 602 until the next scheduled/sensor event.

On the other hand, a non-scheduled event is something that happens at the sensor (step 608). The event may be a change in lumen level or dimming level of the luminaire. The sensor sends the information to the gateway 102, which determines based on the standard operational mode 530 whether a Baseline and/or Updates message is required in light of the sensor event. If so, the gateway 102 sends the information to the server and Luminaire and Driver DB 416 as a Baseline or Updates message.

According to the exemplary embodiments, a scheduled dimming level and sensor reading test 604 includes a plurality of sensor readings such as, for example and without limitation, measuring light intensity and/or environmental conditions, waiting for the lumen or light intensity readings for the luminaire 112 to reach a specific level/range, waiting for the ampere (AMP) reading to reach a specific range of power consumption of the luminaire 112, and reading light intensity for a plurality of colors multiple times. When a sensor event 608 occurs there can be multiple outcomes, such as explained with respect to FIG. 4. If the sensor reading is the last sensor reading required for this specific scheduled dimming measurement, the gateway 102 can make a decision if the set of measurements requires a new Baseline message 614 or an Updates message (FIG. 7) based at least in part on a threshold deviation from a previous or initial sensor reading for the luminaire 112. In the case of a Baseline message, the gateway 102 will format a new Baseline message, send it to the cloud server 106, and update the message status database 616 to wait for the next event.

The handling of Updates message is covered in FIG. 7, described further below. In any case, after an Updates message is handled the gateway 102 can go back to a waiting, or sleep, mode.

A third case is when there are more events associated/chained to the current scheduled dimming that the gateway 102 must wait for, for example scheduled dimming level and sensor reading tests 604. In this case, the gateway 102 waits for those events in an effective sleep mode. Current events in the exemplary embodiment shown in FIG. 6 are always recorded in the Sensor Events DB 612, where all accumulated and scheduled events and/or resultant information are recorded for future processing.

Thus, FIG. 6 depicts the USLG gateway standard operation mode 530 as follows: At step 602, the gateway 102 spends most of its time sleeping and waiting for an event. At step 604, the gateway 102 checks for any triggered scheduled tests, which are waiting in the Dimming & Testing schedule database 524. If 'Yes'—a test is triggered, then the operation moves to step 606 where the gateway 102 sets the dimming protocol to the requested dimming level and receives relevant measurements from the sensor(s). After step 606, the gateway 102 performs step 610 where the gateway 102 starts to monitor sensor events. For every event that occurs, the operation moves to step 612 where the gateway 102 updates the sensor events database. Note that monitoring sensor events occurs in parallel/in the background by step 610 and the rest gateway 102 also moves to step 602 where the gateway 102 again waits for an event to occur.

If at step 604 there is no scheduled testing event waiting, e.g., 'No', then the operation moves to step 608, where the gateway 102 checks for any triggered sensor events as previously described. At step 608, the gateway 102 checks for any triggered sensor events. If the response is 'Yes', then the operation moves to step 614. If the response is 'No', then the operation goes back to step 602 and waits for an event to occur. At step 614, the gateway 102 decides if the sensor reading requires a baseline messages. If the response is 'Yes,' then the operation moves to step 616. If the response is 'No', then the operation moves to step 620. In one embodiment, the decision is based on multiple factors, but mostly on any changes between a previous baseline message and what would be a current baseline message, as well as when there is no prior baseline message, and/or a change in the dimming level.

At step 616, gateway 102 sends baseline message to the server 106 and then moves to step 618 where the message status database gets updated. When there is no need for a Baseline message but a need for an updates message, the gateway 102 goes to step 620. When message generating is done, the gateway 102 moves to step 602 and waits for the next event.

Figure 7:
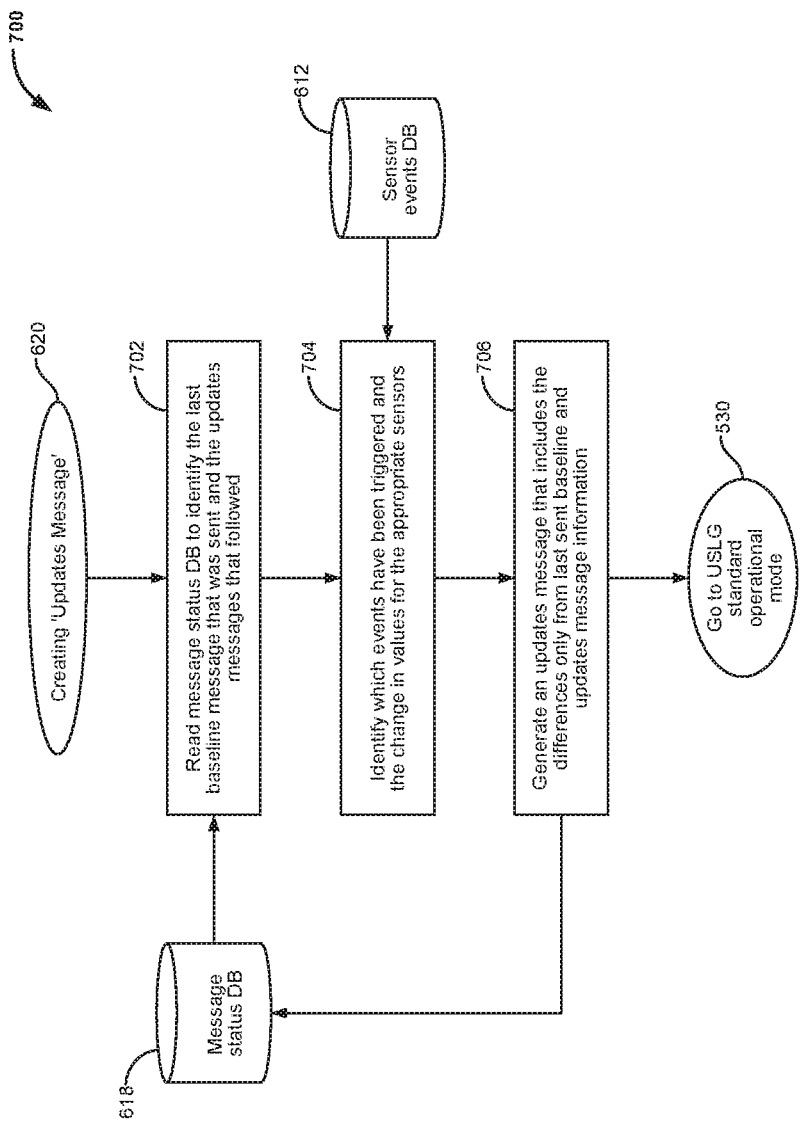
FIG. 7 depicts an exemplary embodiment of creating 'Updates Message'.

FIG. 7 depicts one exemplary embodiment 700 of creating Updates message as follows. Creating an Updates message depends on the accumulation of all prior messages sent and recorded in the Message Status DB 618. Based on past messages, including, among other things, sensor readings, dimming levels, light intensity, etc., and current corresponding information from the Sensor Events Database 612, the gateway 102 can identify sensor readings 702 that have changed 704 and can format a message to include those readings 706 only and send this message to the cloud server 106. Once this message is sent, the Message Status DB 618 is updated for future analysis of changes in, for example, the information identified above, and the gateway 102 waits for the next event as part of the standard operational mode 530. In an exemplary embodiment, Updates message(s) may also be sent at regular time intervals and sensor readings from sensor subsystem 108 can be averaged over the time interval.

At step 702, the gateway 102 receives messages from Message Status DB 618 to, among other things, identify the last Baseline message and Updates message(s) that had been sent. At step 704, after receiving information from the Sensor Events DB 612, gateway 102 identifies which of the events have been triggered and what changes have taken place in the values for the appropriate sensors versus the previous Baseline/Updates message(s) received from the Message Status DB 618. At step 706, the gateway 102 generates an Update message, which includes the difference(s) between last sent Baseline message(s) and the Updates message including the current information, such as sensor readings from Sensor Events DB 612. At step 530, the gateway 102 moves into standard operational mode 530. At the same time, at step 706, the gateway 102 updates the Message Status DB 618.

Figure 8:
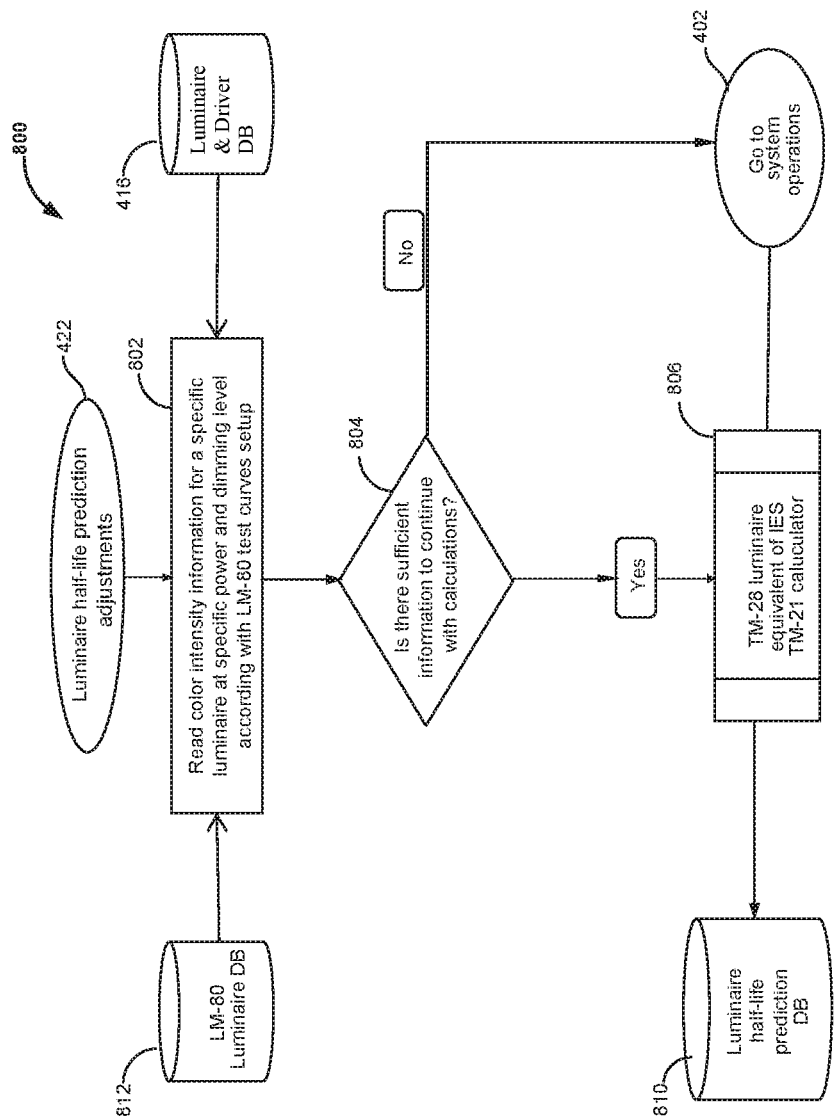
FIG. 8 depicts an exemplary embodiment of the cloud servers calculating specific luminaire half-life prediction information.
Figure 8A:
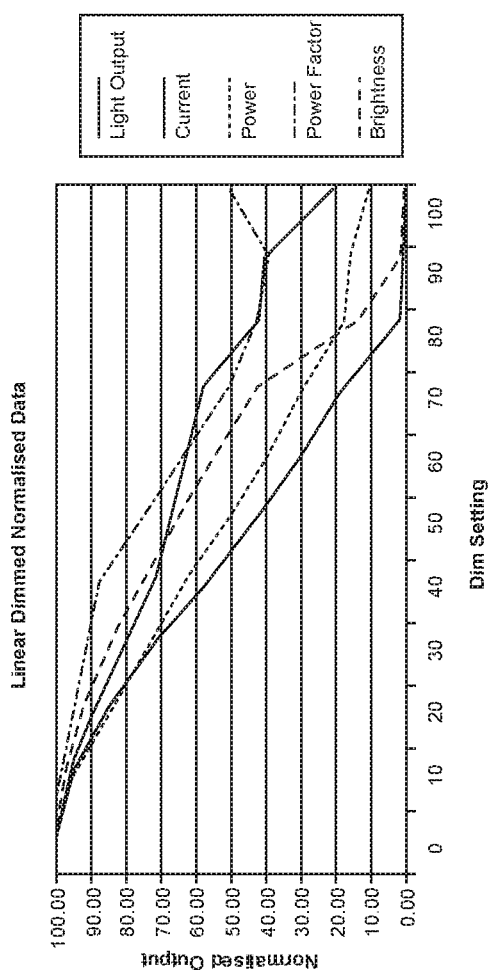
FIG. 8A depicts an exemplary light degradation graph.

FIG. 8 depicts an exemplary embodiment 800 of at least one cloud server calculating specific luminaire half-life prediction information. In order to calculate luminaire degradation, upward looking color sensors provide light intensity and/or luminosity readings/measurements that are linearly correlated to a luminaire light intensity depreciation graph (FIG. 8A). The linear correlations are normalized over time in this embodiment and the color sensors are consistent in their readings across a plurality of sensors such that when an LED light intensity reading is changing by X %, the sensor light intensity reading changes by the same X %. The sensor 'total intensity readings' may not be equivalent to the actual lumen emission by the luminaire device that the sensors are attached to due to any number of factors such as distance or orientation of the sensor to the light source, interference, baseline readings of lumen intensity at initialization of the lighting system etc. The disclosed systems and methods allow the light intensity of each luminaire to be accurately correlated at any given time, regardless of the type of luminaire, because the data is dynamic and normalized. The normalized, linear correlations also provide compensation for differences between different types of dimming controllers (drivers) and inherent variations in tolerances of the same dimming controllers.

When exponential graphs are linearly correlated, a change in one (the curve) can fit the curve (change) in the other directly. Illuminating Engineering Society of North America (IESNA) Standard LM-80 ("Approved Method for Measuring Lumen Maintenance of LED Light Sources") includes manufacturing data for a plurality of LED light sources, which when paired with a luminaire's chip running temperature can provide theoretical predictive life calculations. By testing the luminaire to IESNA LM-79 ("Approved method for the Electrical and Photometric Measurements of Solid-State Lighting Products") standards and utilizing any IESNA Standard LM-82 ("Characterization of LED Light Engines and LED Lamps for Electrical and Photometric Properties as a Function of Temperature") data that may be available, a Luminaire and Driver DB 416 may be generated. The Luminaire and Driver DB 416 includes information that is specific to the luminaire fitting and dimming profile/protocol, as well as to the sensor reading ranges, etc., associated with the specific luminaire. The Luminaire and Driver DB 416 also includes information such as past sensor readings, associated times of reading, dimming level, temperatures, current readings, etc. Sensor readings such as light intensity, among others, can be normalized based on the original (initial) readings received upon installation and/or commissioning of the luminaire in the lighting system as in FIG. 5.

In one embodiment, an Energy Star® TM-28 calculator, which is the equivalent of an Illuminating Engineering Society (IES) TM-21 ("Lumen degradation lifetime estimation method for LED light sources") calculator 806, is taking data that was collected over time in the Luminaire and Driver DB 416 for test samples and is plotting this information after normalization into TM-28. This step allows for prediction of luminaire maintenance over time. The standard information within LM-80 given by the manufacturer may be insufficient and is dependent on a fixed temperature and the current state of the luminaire for the readings. In one embodiment, the disclosed system is using the sensor readings at specific temperatures and dimming levels to extrapolate the place of the luminaire light intensity readings on the LM-80 given curves of this specific luminaire. Using this information, and knowing the time period elapsed between readings, and after correlating this information with previous readings, the system can extrapolate a new curve that more accurately represents the current luminaire's behavior. As such, the relationship or correlation between light intensity and dimming level can be determined, and this relationship can be updated over time as the light intensity (lumen level) of the luminaire degrades over time. This new curve is based on the luminaire's true environment and usage (e.g., dimming schedule, power and temperature levels, degradation of the lens and the physical fittings, etc.) over time. This information is stored in the Luminaire Half-life Prediction DB 810 for future use, and the next step is to wait for the next event as part of the System Operations 402 (FIG. 4).

The multiple sensor readings associated with light intensity are normalized using an equation that divides the current reading by the initial reading taken when the luminaire was first installed and/or commissioned in the lighting system as in FIG. 5.

According to an aspect, the luminaire 112 and dimming control 110 half-life adjustments/end of life predictions begins at step 802, where the cloud server 106 receives from the sensor subsystem 108, gateway 102, power meter 114, and other system components light intensity, dimming level, power consumption, and environmental information for a specific luminaire 112 at a specific power level and temperature. In an embodiment, step 802 occurs after the cloud server 106 has received information from the LM-80 Luminaire DB 812 and the Luminaire and Driver DB 416. The Luminaire and Driver DB 416 may include information specific to the fitting and dimming, as well as to the sensor reading expected ranges, associated with the specific luminaire 112. According to an aspect, the Luminaire and Driver DB 416 may also include all past sensor readings, with the associated times/time stamps of the reading(s), dimming levels, temperatures and current readings that were taken. In an embodiment, the sensor subsystem 108, temperature, and current readings regarding, e.g., light intensity, dimming level, environmental conditions, etc., can be normalized based on previous and/or the original readings taken upon installation of the luminaire 112, as shown in the setup and discovery operations in FIG. 5.

At step 802, the cloud servers 106 may read information received from Driver Manufacturers DB 812 (LM-80 Luminaire DB) and the Luminaire and Driver DB 416 for the specific luminaire 112. The information may include the specific power levels and temperatures as well as the sequence of temperature changes acting upon the electronic dimming control 110. According to an aspect, the Luminaire and Driver DB 416 includes information that is specific to the luminaire, the dimming control 110 and the dimming level, as well information that is specific to the expected ranges of the sensor readings of the specific luminaire 112. As described in further detail hereinabove, the Luminaire and Driver DB 416 may also include all past readings with associated time stamps, and may normalize the readings based on the original (initial) readings received upon installation of the luminaire 112, for example the lumen intensity and dimming level. At step 804, the cloud server 106 may decide if the collected and/or accumulated information/readings from, e.g., LM-80 Luminaire DB 812 and Luminaire and Driver DB 416, are sufficient to continue with half-life prediction and/or end of life calculations. If the response is 'No', then the operation moves to step 402, which is the system operation main loop where the cloud server 106 will wait for and continue to collect information and measurements from the sensor subsystem 108, gateway 102, power meter 114, and other components of the exemplary system 100. If the response is 'Yes', then the operation moves to step 806.

At step 806, the TM-28 luminaire equivalent of the IES TM-21 calculator takes data that was collected over time in the Luminaire and Driver DB 416 to create a test sample. The data for the test sample may be plotted in a graphical format, after normalization of the data into the TM-28 luminaire. According to an aspect, this step allows for the prediction of lumen maintenance over time, which helps to predict potential failure of the luminaire 112. At step 810, the information generated in step 806 is stored in the Luminaire Half-Life Prediction DB 810 for future use, thus the system 100 may retain the information and use the information to create further end-of-life predictions based on failure variable indications of the dimming control 110 and, optionally of the luminaire 112.

Figure 9:
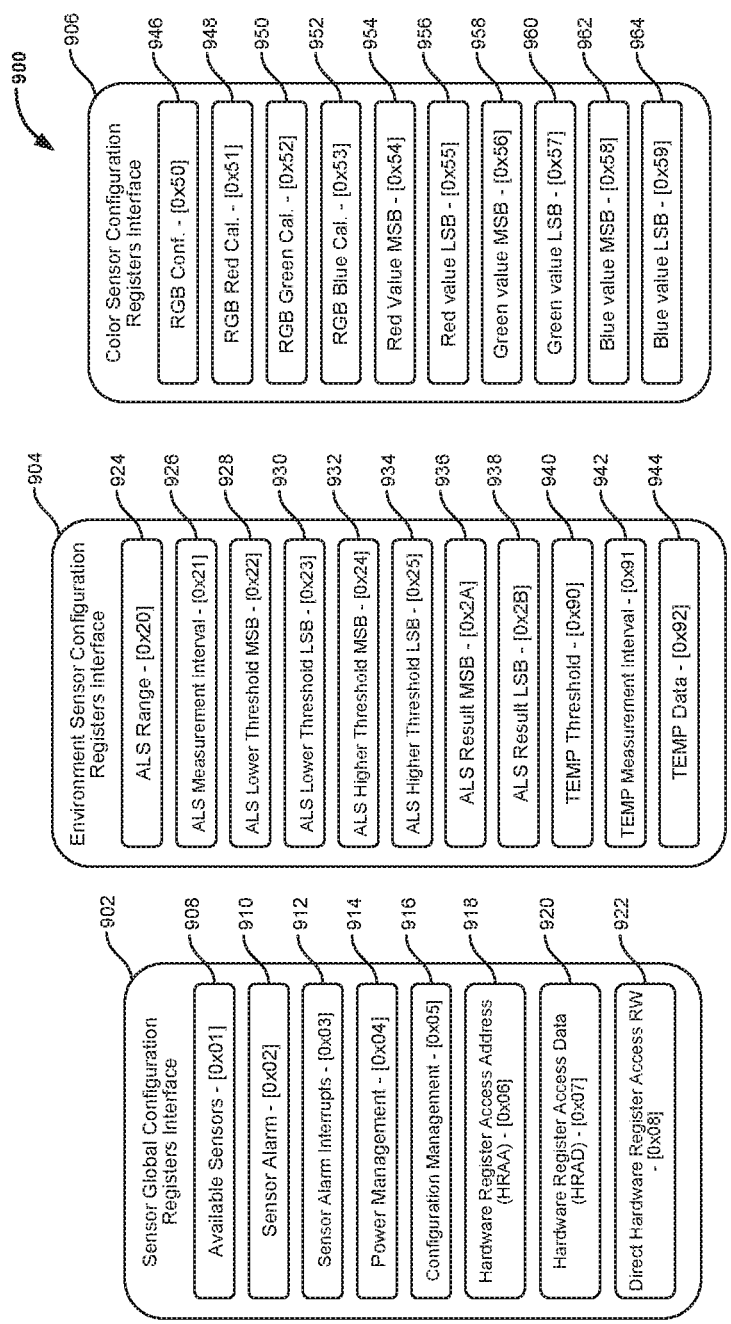
FIG. 9 depicts an exemplary embodiment of sensor interfaces data structures.

FIG. 9 depicts an embodiment 900 of the sensor interface data structures. The sensor interfaces include the Sensor Global Configuration Registers Interface 902, the Environment Sensor Configuration Registers Interface 904, and the Color Sensor Configuration Registers Interface 906. In one embodiment, these data structures are memory mapped registers. To send information via a memory mapped register the application writes to the memory address that was allocated for this register. To receive information, the application reads the memory address that was allocated for the specific register. In FIG. 9 the relative address of the register is marked in boxed brackets '[ ]'. The size of every address is exactly one byte (eight bits) in the exemplary embodiment shown in FIG. 9.

The Sensor Global Configuration Registers Interface 902 includes a plurality of global configuration registers responsible for performing a plurality of activities. Available Sensors—e.g., [0x01] 908—shows which sensors are available for the particular device. The Available Sensors may show at least a Temperature Sensor (TEMP), an Ambient Light Sensor (ALS), a color sensor (RGB), a Motion detector sensor based on Passive Infrared (PIR), a Motion detector and direction sensor based on frame capture, and so on. Sensors Alarm—[0x02] 910 shows which sensors have generated an interrupt. Sensors Alarm Interrupts—[0x03] 912 enables/disables interrupt from each available sensor whenever an alarm is generated. Power Management—[0x04] 914 controls power up/power down functions for the different sensors. Configure Management—[0x05] 916 stores register values in non-volatile memory. Hardware Register Access Address (HRAA)—[0x06] 918 holds the address for accessing the internal hardware registers of sensors. Hardware Register Access Data (HRAD)—[0x07] 920 holds the data to load/store in the address given in the register HRAA—[0x06] 918. Direct Hardware Register Access RW—[0x08] 922, if it holds a value "1", then the data in the register HRAD—[0x07] 920 is written to the address in register HRAA—[0x06] 918. If Direct Hardware Register Access RW—[0x08] 922 holds a value "0", then the data pointed to by register HRAA—[0x06] 918 can be read in register HRAD—[0x07] 920.

The Environment Sensor Configuration Registers Interface 904 includes a plurality of environment specific sensor registers. Ambient Light Sensor (ALS) Range—[0x20] 924, if it holds a value "1", enables a high measurement range of 1000-10,000 Lux for the ALS. If ALS Range—[0x20] 924 holds a value "0", then a low measurement range of 1-1,500 Lux gets enabled. ALS Measurement Interval—[0x21] 926 displays the elapsed time between subsequent ALS measurements. ALS Lower Threshold MSB—[0x22] 928 displays Most Significant Byte (MSB) for ALS lower threshold for triggering an alarm. ALS Lower Threshold LSB—[0x23] 930 displays Least Significant Byte (LSB) for ALS lower threshold for triggering an alarm. ALS Higher Threshold MSB—[0x24] 932 displays MSB for ALS higher threshold for triggering an alarm. ALS Higher Threshold LSB—[0x25] 934 displays LSB for ALS higher threshold to trigger an alarm. ALS Result MSB—[0x2A] 936 displays MSB for ALS measurement results. ALS Result LSB—[0x2B] 938 displays LSB for ALS measurement results. TEMP Threshold—[0x90] 940 displays upper threshold value for when an interrupt is triggered. TEMP Measurement Interval—[0x91] 942 displays a temperature measurement interval in seconds. TEMP Data—[0x92] 944 displays temperature values in degrees Celsius.

The Color Sensor Configuration Registers Interface 906 includes a plurality of color specific sensors. In one embodiment, the colors are Red, Green and Blue (RGB). RGB Conf.—[0x50] 946 controls both calibration configuration and reports when a sensor reading is available. RGB Red Cal.—[0x51] 948 displays calibration constant for red value from RGB sensor. RGB Green Cal.—[0x52] 950 displays calibration constant for green value from RGB sensor. RGB Blue Cal.—[0x53] 952 displays calibration constant for blue value from RGB sensor. Red Value MSB—[0x54] 954 displays MSB result of Red value from RGB sensor. Red Value LSB—[0x55] 956 displays LSB result of Red value from RGB sensor. Green Value MSB—[0x56] 958 displays MSB result of Green value from RGB sensor. Green Value LSB—[0x57] 960 displays LSB result of Green value from RGB sensor. Blue Value MSB—[0x58] 962 displays MSB result of Blue value from RGB sensor. Blue Value LSB—[0x59] 964 displays LSB result of Blue value from RGB sensor. Any of a plurality of colors can be used for light intensity measurements. The sensor chosen depends on the LED/luminaire color utilization. Luminaire devices may have design based or physics based preferences to emit specific colors; the color sensor used in every specific case should be based on those preferred colors. The RGB given in this example is based on one embodiment; other embodiments may use other colors.

Figure 10:
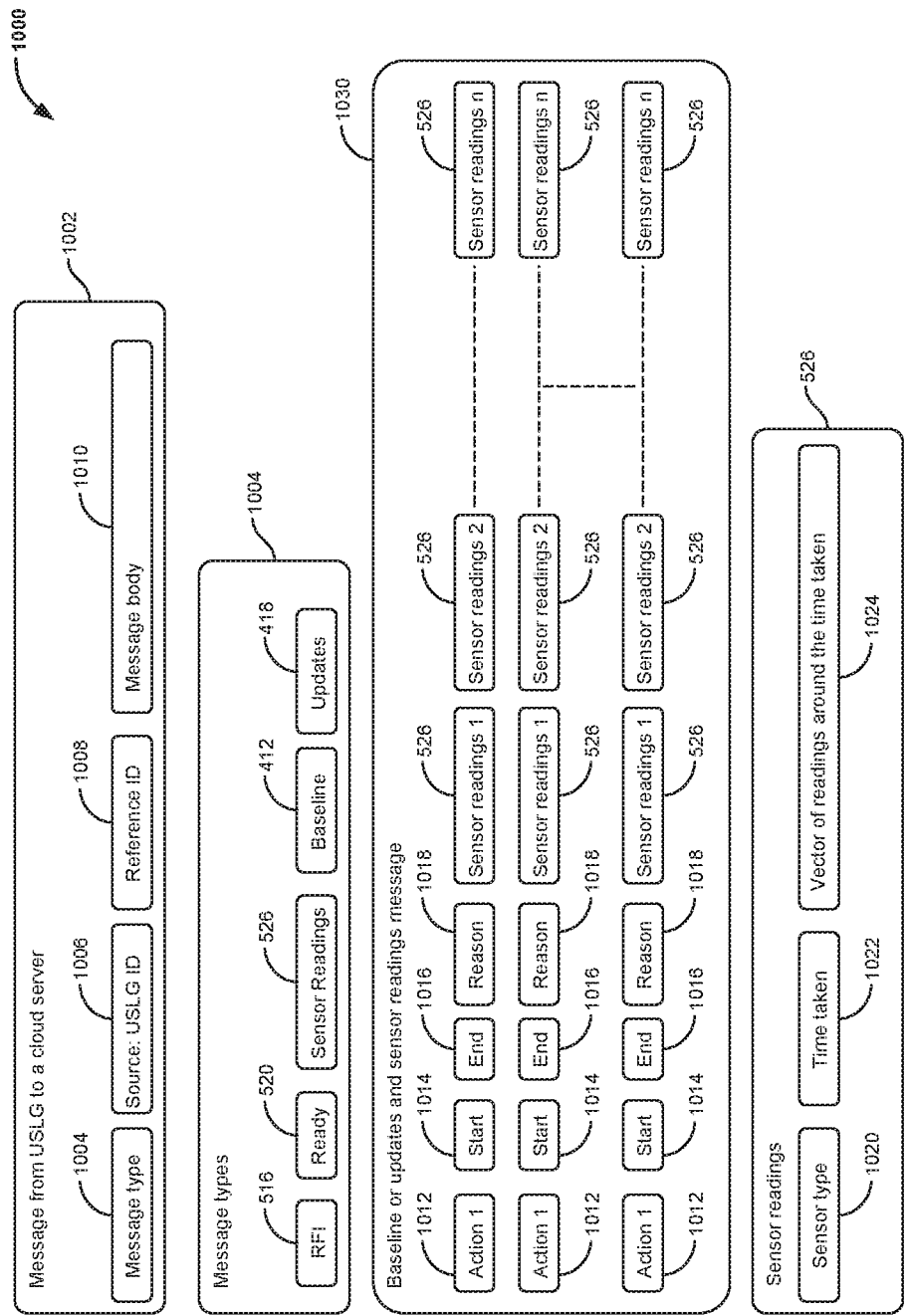
FIG. 10 depicts an exemplary embodiment of message structure for messages delivered from the gateway to the cloud servers.

FIG. 10 depicts an embodiment 1000 of message structure for messages delivered from the gateway 102 to the cloud server(s) 106. In one embodiment, the message 1002 going to the cloud server 106 is of a single structure. This structure includes Message type 1004, the sender gateway unique identification (Source: gateway ID) 1006, a unique Reference ID 1008 and the Message body 1010. The Message type 1004 informs the receiver about the type of the message. The reference ID 1008 is an internal number used when there is a conversation between the cloud servers 106 and the gateway 102. The message body 1010 can be a Baseline message or an Updates message and it is structured the same in both cases.

In one embodiment 'Message types' 1004 can be a 'Request for Information' (RFI) 516, which is sent upon initialization of the luminaire. A 'Ready' message 520 is sent during initializations of the luminaire after discovering the dimming protocol and when the gateway 102 is ready for further instructions. Sensor readings message 526 is sent to the cloud servers 106 during the initialization period. The 'Baseline' 412 and the 'Updates' 418 message types are used when sending Baseline or Updates messages that are based on cloud servers' 106 prior scheduled sensor readings by the specific gateway 102.

In one embodiment, the 'Baseline or Updates and Sensor Readings Message' 1030 is a 'Message body', which is sent for the Baseline 412, Updates 418 and sensor readings 526 message types. The message stature is the same. For every 'action' 1012, which can be a dimming level set, there is a 'Start' 1014 which is the actual start time, 'End' 1016 which is the time the action was terminated, 'Reason' 1018 which is why the action terminated, and sensor readings 526 for all sensors participating in this action as they were scheduled by the cloud server 106. The 'Reason' 1018 why the action terminated can be, e.g., failure to obtain an accurate feedback dimming level.

The Sensor reading 526 part of the message includes a 'Sensor type' 1020 field to indicate which sensor reading this is (TEMP, ALS, RGB, etc.), a 'Time taken' 1022 field to indicate when it was taken, and a 'Vector of readings' 1024 which includes multiple readings centered around the 'Time taken' 1022 field. In one embodiment, the number of readings can be based on the sensor type. In another embodiment, the number of readings is three, including shortly before, at, and shortly after the 'Time taken' 1022 field value.

Figure 11:
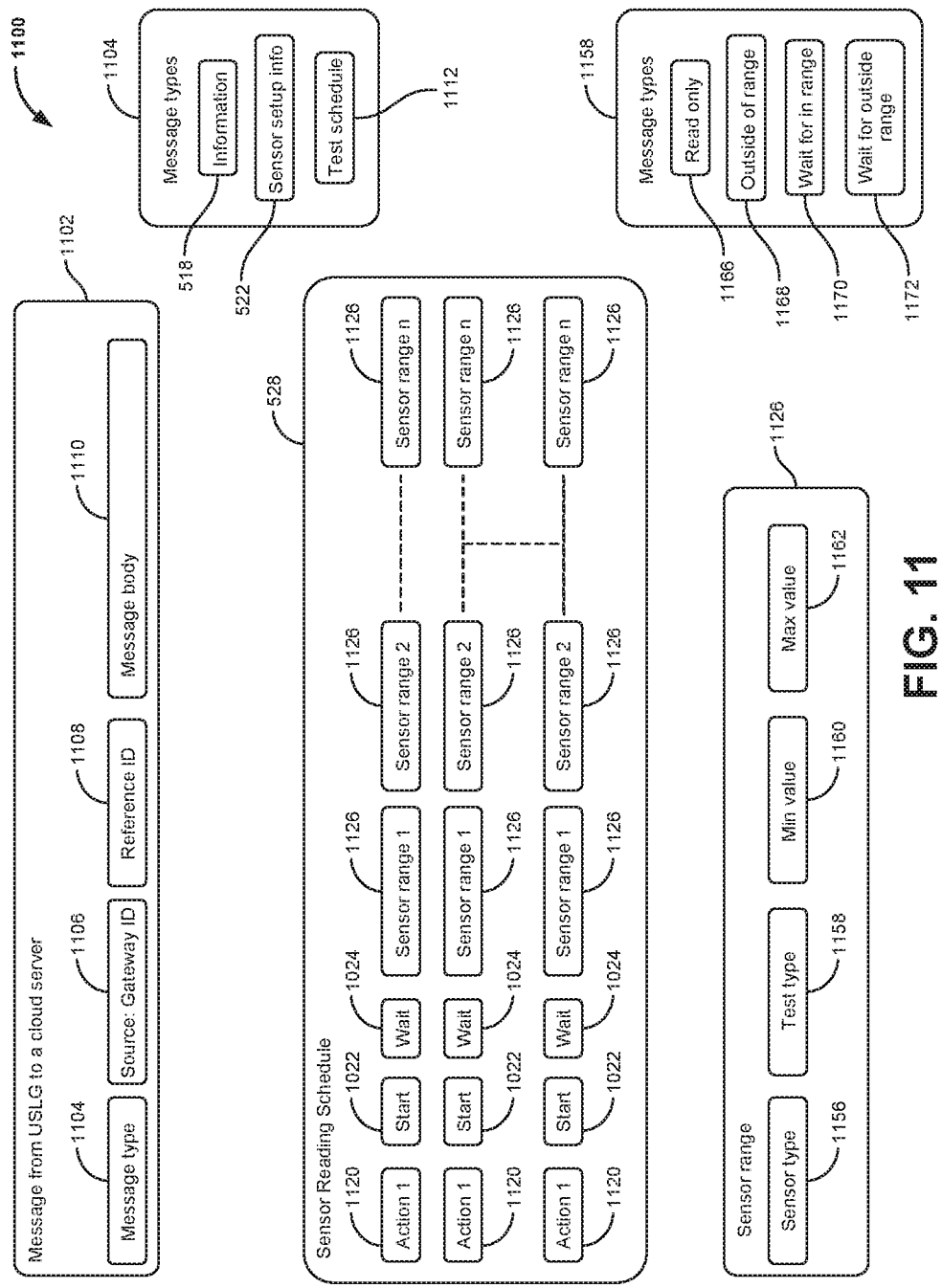
FIG. 11 depicts an exemplary embodiment of message structure for messages delivered from the cloud servers to the gateway.

FIG. 11 depicts an embodiment 1100 of message structure for message delivered from the cloud server(s) 106 to the gateway 102. In the exemplary embodiment, the structure of the message 1102 is constant. This structure includes Message type 1104, a target gateway unique identification 1106, a unique Reference ID 1108 and the Message body 1110. The Message type 1104 lets the receiver know what kind of message it is. The reference ID 1108 is an internal number used when there is a conversation between the cloud server 106 and the gateway 102. The Message body 1110 is a Sensor Reading Schedule 528 (see FIG. 5) in the exemplary disclosed embodiment.

In one exemplary embodiment, the Message types 1104 are 'Information' 518, 'Sensor Setup Info' 522 and 'Test Schedule' 1112. The 'Information' 518, such as the 'Sensor Setup Info' 522 messages provides the gateway 102 with information about valid ranges for sensor readings at different dimming levels. The Message body 1110 is a Sensor Reading Schedule 528 that is a baseline for the gateway 102 in its internal measurement and initialization cycle. The gateway 102 will have a default setup, yet this message can update this default.

In one exemplary embodiment, the Sensor Reading Schedule 528 includes an 'Action' 1120 field, which is the dimming level, the 'Start' 1122 field, which is the start time for the test, the 'Wait' 1124 field which is the duration to wait before any measurement commences, followed by a list of sensors that participate in the measurements 1126. The list of sensors is given as a list of Sensor ranges per sensor 1126.

In one embodiment, the Sensor range 1126 includes 'Sensor Type' 1156 field, which identifies the sensor, 'Test Type' 1158 field, which informs the gateway 102 how to run the test, and 'Min Value' 1160 and 'Max Value' 1162 fields, which provide the valid range for the sensor in this test. In one embodiment, the 'Test Type' 1158 directs the gateway 102 in ways to handle different sensor values. When Test Type 1158 is 'Read Only' 1166 the value of the sensor is retrieved regardless of range. When Test Type 1158 is 'Outside of Range' 1168 the value of the sensor must be outside of the range to be retrieved. When Test Type 1158 is 'Wait for in range' 1170 the gateway 102 does not continue with other readings until the specific sensor is in given range. When Test Type 1158 is 'Wait for outside range' 1172 the gateway 102 will not continue to read sensor values until this sensor value is outside the given range.

Figure 12:
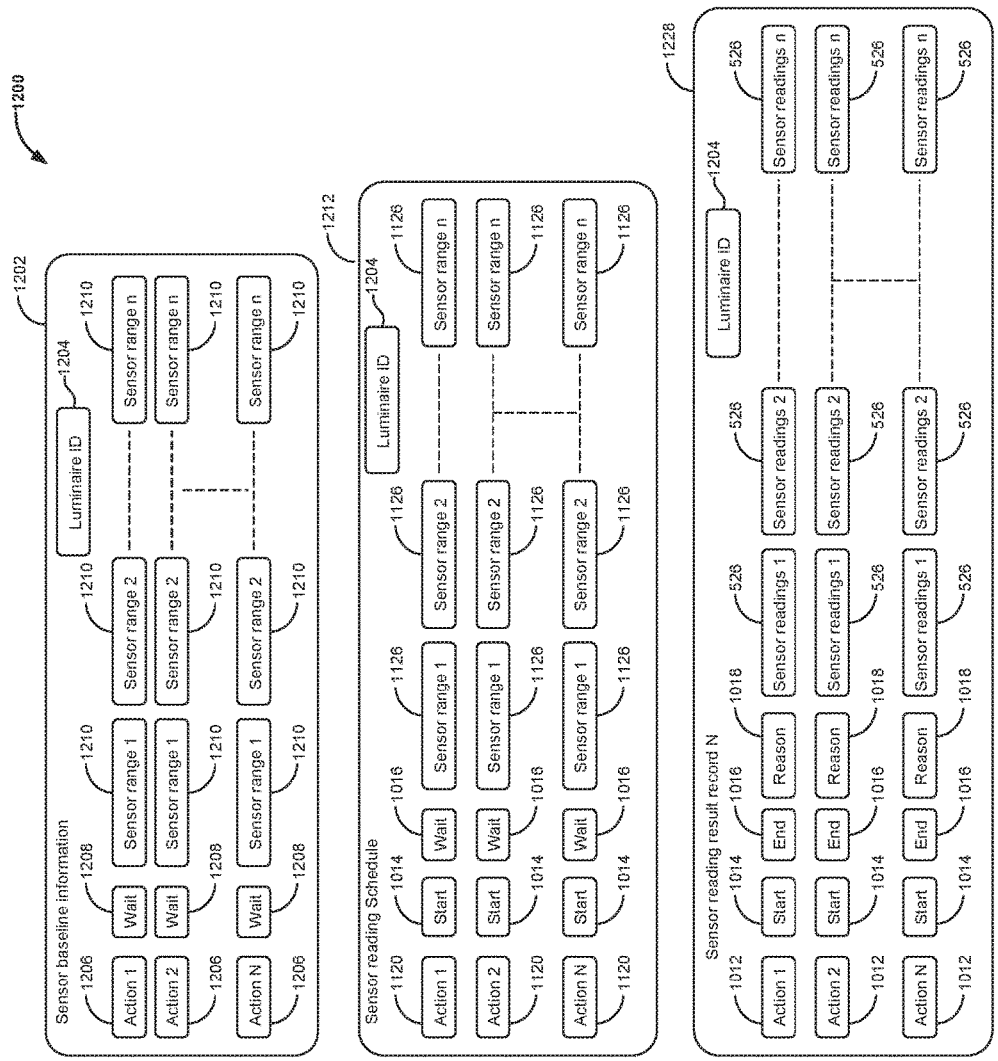
FIG. 12 depicts an exemplary embodiment of the Luminaire Database structure.

FIG. 12 depicts an embodiment 1200 of the Luminaire and Driver DB 416 structure. In one embodiment, the Luminaire and Driver DB 416 includes three types of records for every connected luminaire in the system. The records are: Sensor Baseline Information 1202, Sensor Reading Schedule 1212 and Sensor Reading Result Record 1228. There is a single Sensor Baseline Information 1202 and Sensor Reading Schedule 1212 record per luminaire. The Sensor Reading Result Record 1228 is numbered between 1 and N. This type of record is being added for every measurement result, such as, among other things, light intensity, dimming level, environmental conditions, time stamps, and other disclosed measurements/readings, and is kept for as long as the system needs such information to determine half-life and end of life information for the luminaire 112.

In one embodiment the Sensor Baseline Information 1202 includes sensor range information for all possible dimming levels that might be tested for this specific luminaire. Each dimming action field 1206 includes the minimal Wait time 1208, which the gateway 102 must wait before taking sensor measurements, and a list of Sensor range fields 1210, one per sensor that needs to be monitored. The Luminaire ID 1204 field is for identifying the luminaire that the record belongs to.

In one embodiment, the Sensor Reading Schedule 1212 record is identical to the Sensor Reading Schedule 528 as described in FIG. 11, except for one additional field—the Luminaire ID 1204 field that is used to identify the luminaire to which the record corresponds.

In one embodiment, the Sensor Reading Result Record 1228 is an accumulation of the Sensor Reading Message 1030 as described in FIG. 10, except for one additional field—the Luminaire ID 1204 field which is used to identify the luminaire that this record belongs to. In fact, every time the cloud server 106 receives a Sensor Reading Message 1030 that might be a Baseline message or an Updates message, the cloud server 106 will store this message as a Sensor Reading Result Record 1228 for the specific luminaire.

Figure 13:
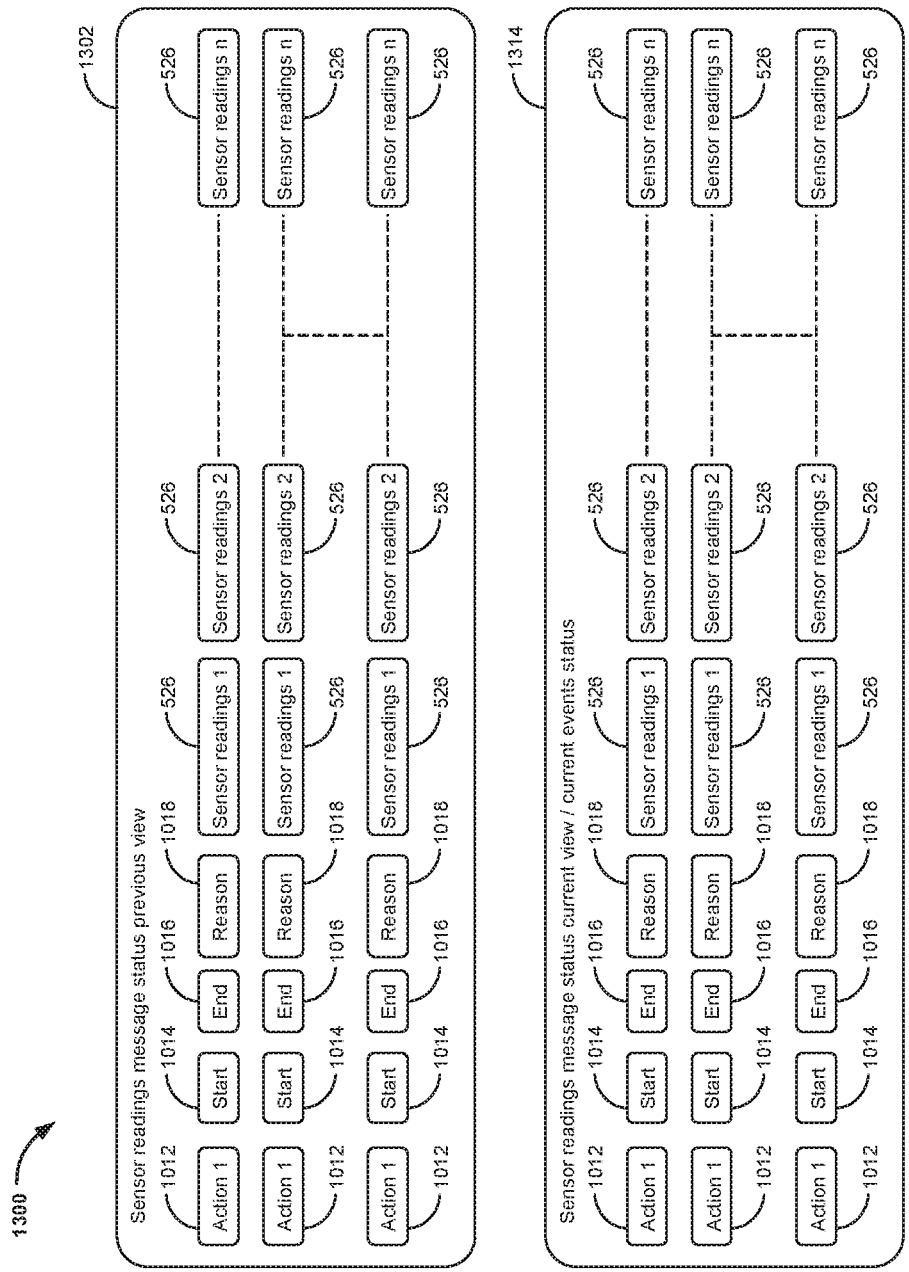
FIG. 13 depicts an exemplary embodiment of the Events Database and the Message Status Database structures.

FIG. 13 depicts an embodiment 1300 of the Sensor Events DB 612 and the Message Status DB 618 structures. In one embodiment, as disclosed in FIG. 6, the Message Status DB 618 is an accumulation of all sensor events associated with the reporting of scheduled test results. The Sensor Events DB 612 is used to record events in real time such that the information is recorded into the appropriate structures for future messages to be generated. In one embodiment, the Message Status DB 618 contains two records. The first record is a Sensor Readings Message Status Previous View 1302, and the second record is the Sensor Readings Message Status Current View/Current Events Status 1314. When reading events are triggered, the appropriate fields in the Readings Message Status Current View/Current Events Status 1314 record are updated. When an Updates message is being sent or before a Baseline message is being sent, the content of the Sensor Readings Message Status Current View/Current Events Status 1314 is copied into the Sensor Readings Message Status Previous View 1302. When a Baseline message is being sent the entire Sensor Readings Message Status Previous View 1302 record is being sent as is. The detailed description of the Sensor Readings Message Status Previous View 1302 and the Readings Message Status Current View/Current Events Status 1314 can be found in FIG. 10 under Baseline or Updates and Sensor Readings Message 1030.

Figure 14:
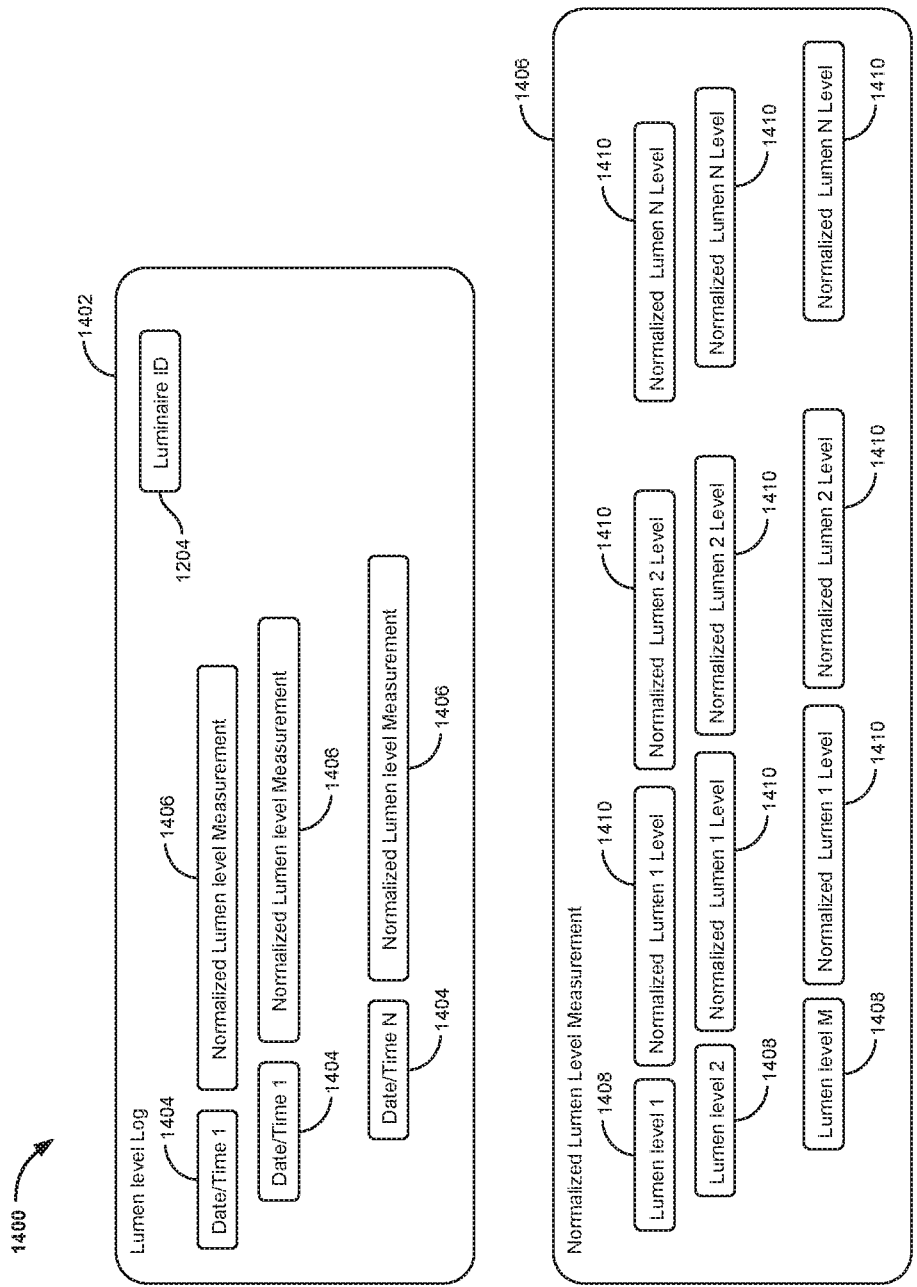
FIG. 14 depicts an exemplary embodiment of the Luminaire Half-Life Prediction Database structure; and, FIG. 15 depicts an exemplary embodiment of handling the lumen level by the system.

FIG. 14 depicts an embodiment 1400 of the Luminaire Half-Life Prediction DB 810 structure. This database is a log for all Normalized Light Intensity or Lumen Level Measurements per luminaire in the system. Every Light Intensity Log 1402 record (one per luminaire) includes the Luminaire ID 1204 field to uniquely identify the luminaire that this record belongs to. The Light Intensity Log 1402 record is composed of N Normalized Light Intensity Measurement 1406 records one per Date/Time in which this measurement was received. In one embodiment, the Normalized Light Intensity Measurement 1406 record is composed of a list of Lumen Level fields 1408. The Lumen Level field 1408 includes the temperature in which a measurement was taken and a list of normalized light intensity measurements 1410, one per color being measured in this system.

Figure 15:
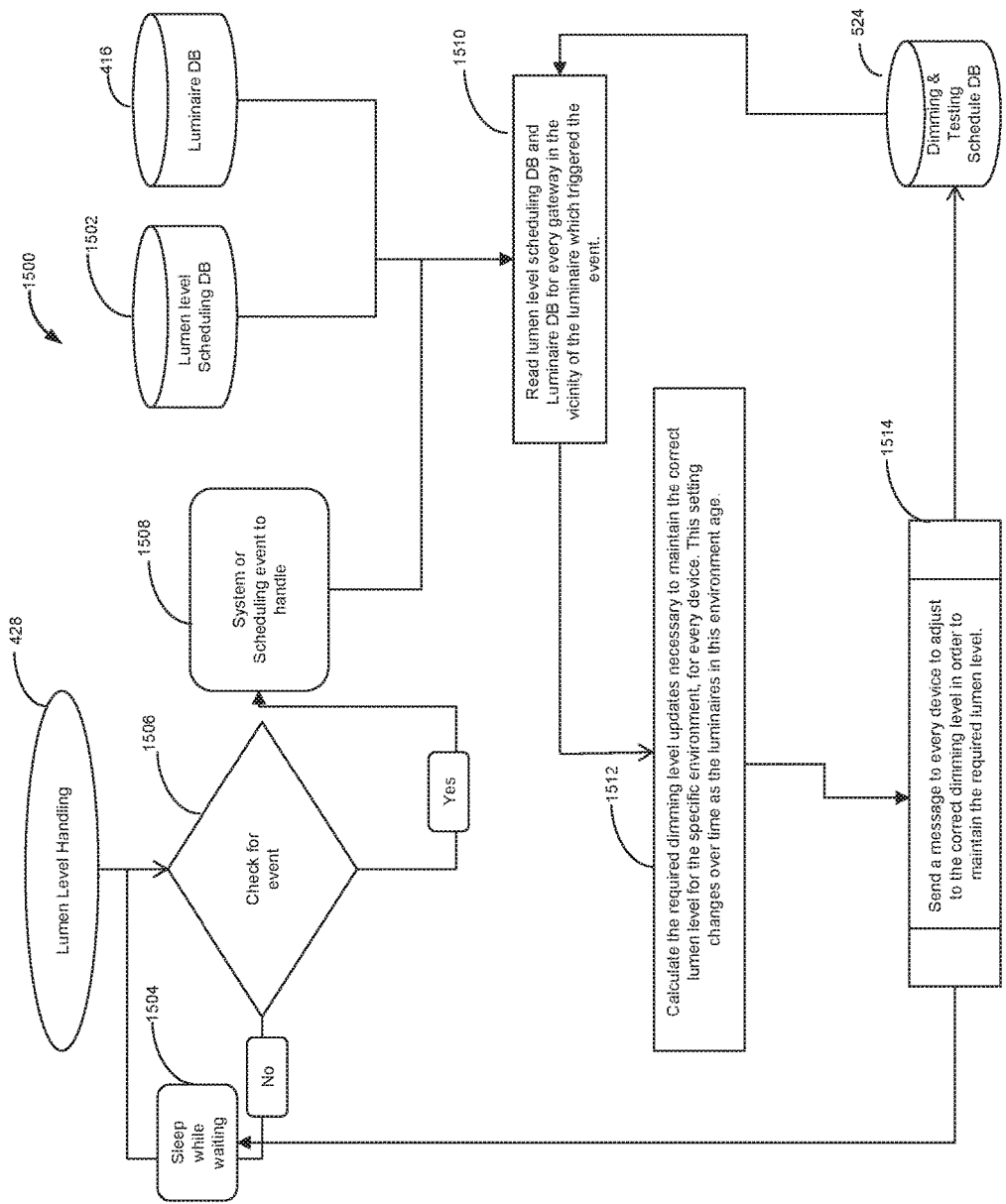

FIG. 15 depicts an embodiment 1500 for handling the lumen level or light intensity by the system. Lumen level handling process 428 is triggered 1508 by either a scheduling event or by a system update of luminaire sensor information. In step 1506 the process checks for events. If an event is found to exist, it continues to step 1508. Otherwise, the process goes into a waiting, or sleep mode 1504 and checks periodically for an event. The scheduling event 1508 can be based on the Lumen Level Scheduling DB 1502, which is maintained according to user and system specific setups (for example: preferred lumen level at preferred times). Upon an event, the lumen level handling process will read the 3 databases—the Lumen Level Scheduling DB 1502, the Luminaire and Driver DB 416, and the Dimming & Testing Schedule DB 524.

Specifically, based upon data provided from any one of databases 1502, 416 or 524, the system can conclude that the lumen level needs to be adjusted. At such time, the server 106 may instruct the gateway 102 to adjust the dimming control and thereby adjust the lumen level of the luminaire.

A change in lumen level in a room or area local to a luminaire can be a result of a dimming schedule or testing schedule event. For operations depicted in FIG. 15, the system is provided with knowledge about the luminaire based on manufacturing and time as part of the Luminaire and Driver DB 416. This information includes, amongst other things, the lumen level at multiple specific dimming levels. When the system is being initialized, a baseline for light intensity and environment sensor readings is established at those specific dimming levels. The correlation between the known measured information received in the Luminaire and Driver DB 416 and the baseline sensor readings provides the information needed to maintain lumen levels. Where the system is not experiencing a controlled dimming or environment testing event, the lumen level handling process will continue to step 1510 in which it compares the current Luminaire and Driver DB 416 information with the lumen level scheduling information. When the sensor subsystem 108 or gateway 102, for example, determines that the sensor readings are outside the lumen level range expected or scheduled, e.g., at a certain dimming level, there is a need to change the dimming level such that the required level is met. In step 1512 the system calculates adjustments when needed per luminaire in the environment of the luminaire that triggered the event. In step 1514, if any change is necessary, the lumen level handling process 428 will trigger a dimming change request(s) by updating the Dimming & Testing Schedule DB 524. A Dimming & Testing Schedule DB 524 is provided for each gateway 102, depending on the type of gateway 102, such that the gateway reads the database information, as depicted in FIG. 6, and schedules a change to the dimming and testing schedule, and potential changes to the dimming level of the luminaire according to the results of the dimming and testing.

Accordingly, the exemplary disclosed devices, systems, and methods provide for automated and dynamic setting, adjusting, and maintaining lumen level of a luminaire by controlling dimming of the luminaire, wherein a server such as a cloud server correlates an initial measured lumen level reading to an initial dimming level, and a gateway sends lumen level readings from upward looking color sensors to the cloud server 106 when the lumen level sensor readings are outside of lumen level sensor ranges expected by the system. In the exemplary disclosed embodiments, the expected ranges of lumen levels may be communicated, for example, from the server 106 to the sensor subsystem 108 or gateway 102, and either system may determine whether a measured lumen level is outside of the expected range provided by the server 106. The cloud server 106 compares the lumen level sensor readings received from gateway 106 to the initial (or a previous) correlation of the measured lumen level sensor reading to the initial dimming level to determine whether the dimming control of the luminaire must be adjusted to maintain a lumen level of the luminaire. In various aspects, the cloud server instructs the gateway to keep the lumen level of the luminaire constant over time. Alternatively, the cloud server can instruct the gateway to adjust the lumen level of the luminaire so as to keep the lumen level of the luminaire at user-set preferences, or in response to pre-scheduled changes such as changes in ambient background lighting over the course of a day.

Although the sensor subsystem 108 and the upward looking sensor has been described according to the exemplary embodiments as determining a lumen level for one or more luminaires, the upward looking sensor in the same or other embodiments may measure any number of features of the luminaire, including but not limited to the color content, color intensity, light intensity, etc., at multiple color channels.

The disclosed devices, systems, and methods, in various embodiments, configurations and aspects, includes components, methods, processes, systems and/or apparatuses substantially developed as depicted and described herein, including various embodiments, sub-combinations, and subsets thereof. The disclosed system, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosed embodiments has been presented for purposes of illustration and description. The foregoing is not intended to limit the disclosure to the form or forms disclosed herein. In the foregoing Detailed Description for example, various features of the disclosed system are grouped together in one or more embodiments, configurations, or aspects for the purpose of streamlining the disclosure. The features of the embodiments, configurations, or aspects of the disclosed systems may be combined in alternate embodiments, configurations, or aspects other than those discussed above. This method of disclosure is not to be interpreted as reflecting an intention that the disclosed system requires more features than are expressly recited in each claim. Rather, as the following claims reflect, claimed features may be less than all features of a single foregoing disclosed embodiment, configuration, or aspect. Thus, the following claims are hereby incorporated into this Detailed Description, with each claim standing on its own as a separate embodiment of the disclosed systems and methods.

Moreover, the description of the disclosed system has included descriptions of one or more embodiments, configurations, or aspects, and certain variations and modifications, other variations, combinations, and modifications that are within the scope of the disclosed system and methods, as may be within the skill and knowledge of those in the art. Furthermore, the above disclosure is not limited by the exemplary embodiments and includes alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein.

What is claimed is:

1. A system for controlling a lumen level of a luminaire, comprising:
    a gateway configured to control at least one of a dimming level and a dimming control protocol of at least one of a first luminaire and a second luminaire;
    a sensor subsystem in data communication with the gateway; and,
    a server in data communication with at least one of the gateway and the sensor subsystem,
    wherein the sensor subsystem is configured to measure a current lumen level of the first luminaire and communicate the current lumen level of the first luminaire to the server if the current lumen level of the first luminaire is outside of an expected lumen level range that is expected by the system, based at least in part on a first relationship determined by a comparison of a correlation between the current lumen level of the first luminaire and a current dimming level of the first luminaire and a correlation between a previous lumen level of the first luminaire and a previous dimming level of the first luminaire,
    wherein the sensor subsystem is further configured to measure a current lumen level of the second luminaire and communicate the current lumen level of the second luminaire to the server if the current lumen level of the second luminaire is outside of the expected lumen level range that is expected by the system, based at least in part on a second relationship determined by a comparison of a correlation between the current lumen level of the second luminaire and a current dimming level of the second luminaire and a correlation between a previous lumen level of the second luminaire and a previous dimming level of the second luminaire, further
    wherein the server is configured to correlate the first relationship and the second relationship to an overall lumen level of an illuminated environment in which the first luminaire and the second luminaire are installed and to determine whether at least one of the current dimming level of the first luminaire, the current dimming level of the second luminaire, a current dimming control protocol of the first luminaire, and
    a current dimming control protocol of the second luminaire must be adjusted to generate a particular overall lumen level, based at least in part on the correlation between the first relationship and the second relationship to the overall lumen level, and, if so, instruct the gateway to adjust the at least one of the current dimming level of the first luminaire, the current dimming level of the second luminaire, the current dimming control protocol of the first luminaire, and the current dimming control protocol of the second luminaire to achieve the particular overall lumen level, and
    the gateway is configured to adjust the at least one of the current dimming level of the first luminaire, the current dimming level of the second luminaire, the current dimming control protocol of the first luminaire, and the current dimming control protocol of the second luminaire according to the instructions from the server.

2. The system of claim 1, wherein the second relationship is different than the first relationship.

3. The system of claim 1, wherein the server is further configured to calculate at least one of a half-life or end of life for the first luminaire based at least in part on at least one of a lumen level change over time of the first luminaire and a comparison of the current lumen level of the first luminaire and the current dimming level of the first luminaire to a past lumen level of the first luminaire and a past dimming level of the first luminaire.

4. The system of claim 3, wherein the lumen level change over time of the first luminaire is determined by comparing the current lumen level of the first luminaire to at least one of the past lumen level of the first luminaire, the past dimming level of the first luminaire, a dimming schedule of the first luminaire, and the dimming control protocol of the first luminaire.

5. The system of claim 1, wherein the server is further configured to instruct the gateway to adjust the at least one of the current dimming level of the first luminaire and the current dimming control protocol of the first luminaire in response to changing conditions in the illuminated environment.

6. The system of claim 1, wherein the sensor subsystem includes at least one environment sensor and one color sensor, the environment sensor is configured to face away or in a downward direction from at least one of the first luminaire and the second luminaire and is at least one of a temperature sensor, a humidity sensor, a motion sensor, and an ambient light sensor, and the color sensor is configured to directly face at least one of the first luminaire and the second luminaire.

7. A method for controlling a lumen level of a luminaire, comprising:

measuring with a sensor subsystem a current lumen level of a first luminaire and a current lumen level of a second luminaire;

transmitting the current lumen level of the first luminaire or the current lumen level of the second luminaire to a server in data communication with at least one of a gateway and the sensor subsystem, if the corresponding current lumen level of the first luminaire or current lumen level of the second luminaire is outside of an expected lumen level range that is expected by the sensor subsystem, based at least in part on a first relationship determined by a comparison of a correlation between the current lumen level of the first luminaire and a current dimming level of the first luminaire and a correlation between a previous lumen level of the first luminaire and a previous dimming level of the first luminaire, and a second relationship determined by a comparison of a correlation between the current lumen level of the second luminaire and a current dimming level of the second luminaire and a correlation between a previous lumen level of the second luminaire and a previous dimming level of the second luminaire;

correlating the first relationship and the second relationship to an overall lumen level of an illuminated environment in which the first luminaire and the second luminaire are installed;

determining with the server whether at least one of the current dimming level of the first luminaire, the current dimming level of the second luminaire, a current dimming control protocol of the first luminaire, and a current dimming control protocol of the second luminaire must be adjusted to generate a particular overall lumen level, based at least in part on the correlation between the first relationship and the second relationship to the overall lumen level, and, if so, instructing the gateway, by the server, to adjust the at least one of the current dimming level of the first luminaire, the current dimming level of the second luminaire, the current dimming control protocol of the first luminaire, and the current dimming control protocol of the second luminaire to achieve the particular overall lumen level; and, adjusting with the gateway the at least one of the current dimming level of the first luminaire, the current dimming level of the second luminaire, the current dimming control protocol of the first luminaire, and the current dimming control protocol of the second luminaire according to the instructions from the server.

8. The method of claim 7, wherein the second relationship is different than the first relationship.

9. The method of claim 7, further comprising calculating with the server at least one of a half-life or end of life for the first luminaire based at least in part on at least one of a lumen level change over time of the first luminaire and a comparison of the current lumen level of the first luminaire and the current dimming level of the first luminaire to a past lumen level of the first luminaire and a past dimming level of the first luminaire.

10. The method of claim 9, wherein the lumen level change over time of the first luminaire is determined by comparing the current lumen level of the first luminaire to at least one of the past lumen level of the first luminaire, the past dimming level of the first luminaire, a dimming schedule of the first luminaire, and the dimming control protocol of the first luminaire.

11. The method of claim 7, wherein the sensor subsystem includes at least one environment sensor and one color sensor, the environment sensor is configured to face away or in a downward direction from at least one of the first luminaire and the second luminaire and is at least one of a temperature sensor, a humidity sensor, a motion sensor, and an ambient light sensor, and the color sensor is configured to directly face at least one of the first luminaire and the second luminaire.

12. The system of claim 1, wherein the previous lumen level of the first luminaire is an initial lumen level of the first luminaire and the previous dimming level of the first luminaire is an initial dimming level of the first luminaire.

13. The system of claim 1, wherein the previous lumen level of the second luminaire is an initial lumen level of the second luminaire and the previous dimming level of the second luminaire is an initial dimming level of the second luminaire.

14. The method of claim 7, wherein the previous lumen level of the first luminaire is an initial lumen level of the first luminaire and the previous dimming level of the first luminaire is an initial dimming level of the first luminaire.

15. The method of claim 7, wherein the previous lumen level of the second luminaire is an initial lumen level of the second luminaire and the previous dimming level of the second luminaire is an initial dimming level of the second luminaire.

* * * * *